(12) United States Patent
Hijikata

(10) Patent No.: US 7,457,694 B2
(45) Date of Patent: Nov. 25, 2008

(54) DRIVING ASSIST SYSTEM FOR VEHICLE

(75) Inventor: Shunsuke Hijikata, Kamakura (JP)

(73) Assignee: Nissan Motor Co., Ltd., Kanagawa (JP)

( * ) Notice: Subject to any disclaimer, the term of this patent is extended or adjusted under 35 U.S.C. 154(b) by 610 days.

(21) Appl. No.: 10/656,173

(22) Filed: Sep. 8, 2003

(65) Prior Publication Data
US 2004/0059482 A1 Mar. 25, 2004

(30) Foreign Application Priority Data
Sep. 18, 2002 (JP) ............................ 2002-271144

(51) Int. Cl.
*G06F 7/00* (2006.01)

(52) U.S. Cl. .......................... 701/36; 701/96; 701/301; 340/576; 340/903

(58) Field of Classification Search ................. 701/301, 701/65, 70, 76, 96, 1, 36; 340/435, 436, 340/937, 939, 942, 576, 903; 348/148, 116; 345/184
See application file for complete search history.

(56) References Cited

U.S. PATENT DOCUMENTS

| | | | | |
|---|---|---|---|---|
| 5,902,345 | A * | 5/1999 | Minowa et al. | 701/96 |
| 5,927,419 | A * | 7/1999 | Tokimoto | 180/170 |
| 6,059,068 | A * | 5/2000 | Kato et al. | 180/402 |
| 6,226,571 | B1 * | 5/2001 | Kai | 701/1 |
| 6,253,635 | B1 * | 7/2001 | Huber | 74/512 |
| 6,445,809 | B1 * | 9/2002 | Sasaki et al. | 382/104 |
| 6,535,114 | B1 * | 3/2003 | Suzuki et al. | 340/435 |
| 6,542,793 | B2 * | 4/2003 | Kojima et al. | 701/1 |
| 6,675,096 | B2 * | 1/2004 | Matsuura | 701/301 |
| 6,850,629 | B2 * | 2/2005 | Jeon | 382/104 |
| 2001/0003810 | A1 | 6/2001 | Shinmura et al. | |
| 2001/0029419 | A1 * | 10/2001 | Matsumoto et al. | 701/80 |
| 2001/0041959 | A1 * | 11/2001 | Satou et al. | 701/70 |
| 2002/0013652 | A1 * | 1/2002 | Yasui et al. | 701/80 |
| 2002/0045981 | A1 * | 4/2002 | Ichikawa et al. | 701/91 |
| 2003/0045982 | A1 * | 3/2003 | Kondo et al. | 701/41 |
| 2003/0094329 | A1 * | 5/2003 | Ogawa et al. | 180/444 |
| 2003/0195684 | A1 * | 10/2003 | Martens | 701/41 |

FOREIGN PATENT DOCUMENTS

| | | |
|---|---|---|
| DE | 198 21 163 A1 | 11/1999 |
| EP | 0 718 173 A2 | 6/1996 |

(Continued)

*Primary Examiner*—Tuan C To
(74) *Attorney, Agent, or Firm*—McDermott Will & Emery LLP

(57) ABSTRACT

A driving assist system for a vehicle comprises a traveling condition recognition device that detects a state of the vehicle and a traveling environment of the vehicle; a risk potential calculation device that calculates a risk potential present around the vehicle based upon detection results obtained by the traveling condition recognition device; a reaction force adjustment device that adjusts reaction force characteristics of a vehicle operating device based upon the risk potential calculated by the risk potential calculation device; an external influence detection device that detects an external influence which will affect an operation of the vehicle operating device by a driver; and a reaction force correction device that corrects the reaction force characteristics of the vehicle operating device adjusted by the reaction force adjustment device, based upon detection results obtained by the external influence detection device.

17 Claims, 28 Drawing Sheets

FOREIGN PATENT DOCUMENTS

| | | |
|---|---|---|
| EP | 1 045 121 A2 | 10/2000 |
| JP | 03-260900 | 11/1991 |
| JP | 07-149193 | 6/1995 |
| JP | 10-166889 A | 6/1998 |
| JP | 10-166890 A | 6/1998 |
| JP | 10-194151 | 7/1998 |
| JP | 10211886 A | 8/1998 |
| JP | 11-29060 A | 2/1999 |
| JP | 2000-052809 A | 2/2000 |
| JP | 2000-054860 A | 2/2000 |
| JP | 2000-067393 A | 3/2000 |
| JP | 2001-151137 A | 6/2001 |
| JP | 2002-19485 A | 1/2002 |
| JP | 2002187539 A * | 7/2002 |
| JP | 2002220992 A * | 8/2002 |
| WO | WO 01/89897 A1 | 11/2001 |

* cited by examiner

<SCENE 1>

OBSTACLE

SUBJECT VEHICLE

STEERING ANGLE θ

<SCENE 4>

OBSTACLE

SUBJECT VEHICLE

STEERING ANGLE

RP

STEERING REACTION FORCE T

SAT CHARACTERISTICS

STEERING ANGLE θ

⇒ STEERING GUIDANCE

ΔTa

<SCENE 3>

OBSTACLE

SUBJECT VEHICLE

STEERING ANGLE

RP

STEERING REACTION FORCE T

CORRECTION

SAT CHARACTERISTICS $\Delta Tb$

STEERING GUIDANCE

0

STEERING ANGLE $\theta$

SAT CHARACTERISTICS UNCHANGED

FIG. 26A <SCENE 4>
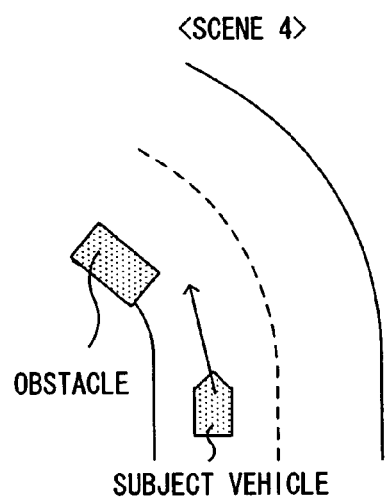
OBSTACLE
SUBJECT VEHICLE
FIG. 26B  STEERING ANGLE
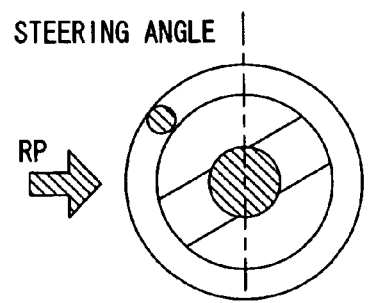
RP
FIG. 26C
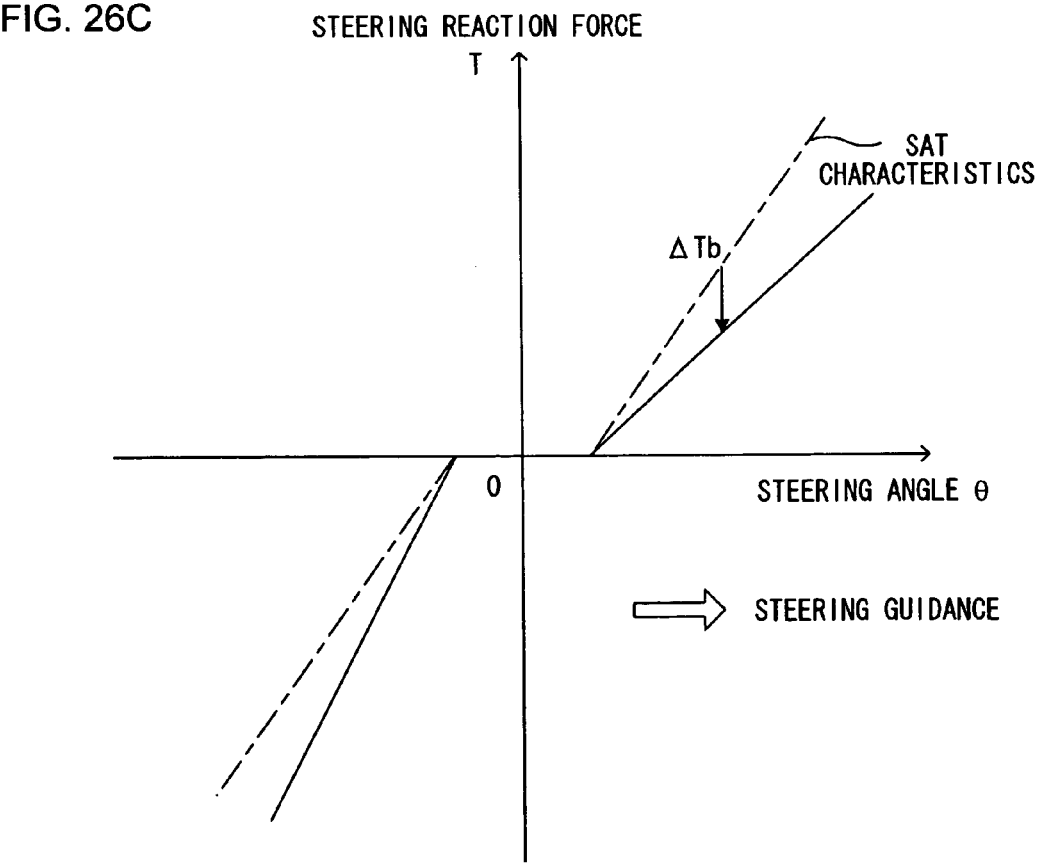
STEERING REACTION FORCE T
SAT CHARACTERISTICS
ΔTb
0    STEERING ANGLE θ
⇒ STEERING GUIDANCE

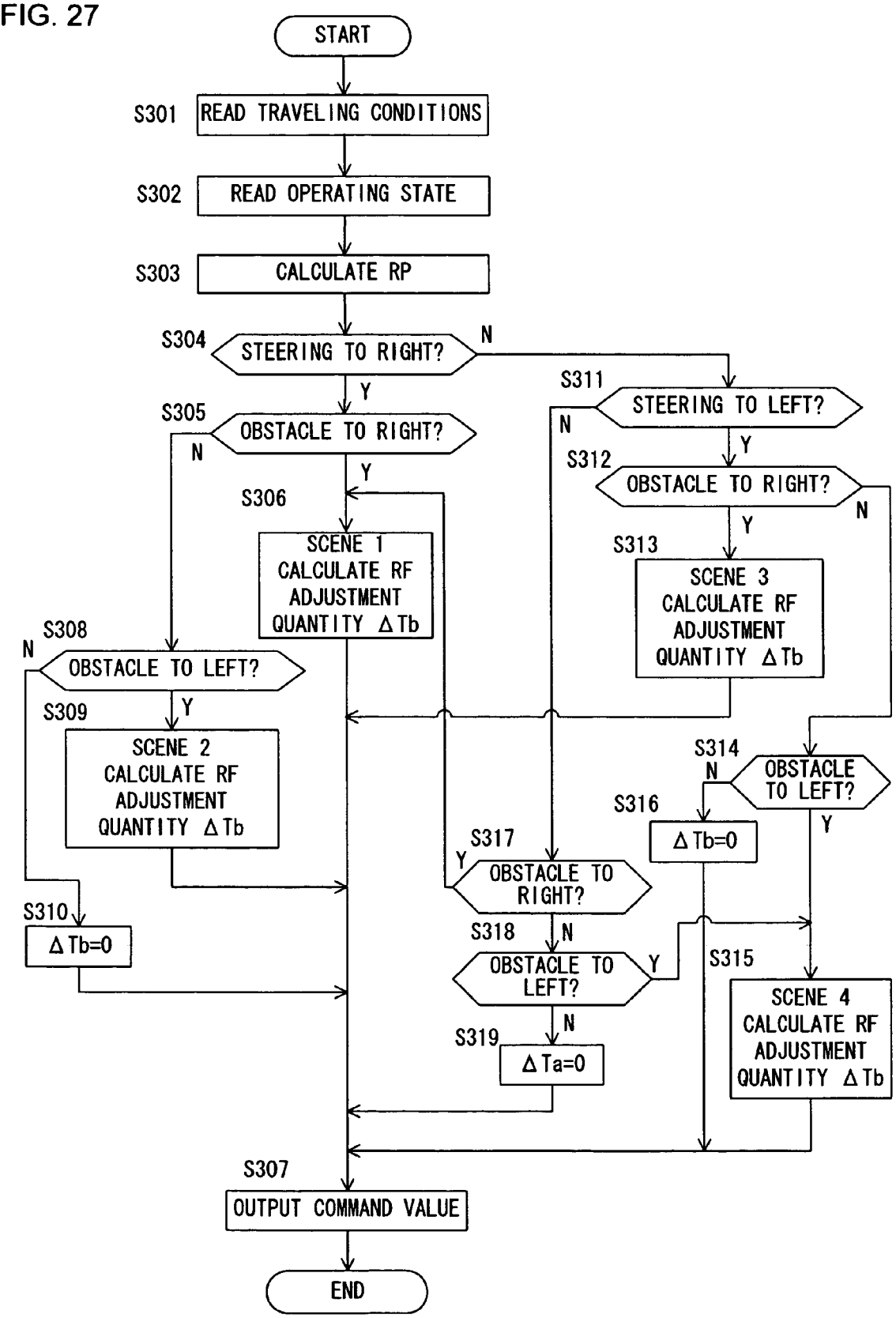

DRIVING ASSIST SYSTEM FOR VEHICLE

BACKGROUND OF THE INVENTION

1. Field of the Invention

The present invention relates to a technology for assisting driver operations, and more specifically, it relates to a driving assist system for a vehicle that assists operations performed by the driver.

2. Description of the Related Art

Systems employed to assist driver operations in the related art include the system disclosed in Japanese Laid Open Patent Publication No. H 10-211886. This system detects the conditions around the vehicle and determines any latent risk potential that may exist. Then, the system inhibits a steering operation that could lead to an undesirable situation by controlling the steering assist torque based upon the calculated risk potential.

SUMMARY OF THE INVENTION

However, since a steering reaction force can be sensed by the same driver differently depending upon the driver condition, it is difficult to communicate the risk potential in a manner well-suited to the state of the driver's perception when the steering torque is controlled by the calculated risk potential based upon the relative motions of the vehicle and obstacles.

The present invention is to provide a driving assist system for a vehicle capable of communicating a risk potential in a manner appropriate to the state of the driver's perception.

A driving assist system for a vehicle according to the present invention comprises a traveling condition recognition device that detects a state of the vehicle and a traveling environment of the vehicle; a risk potential calculation device that calculates a risk potential present around the vehicle based upon detection results obtained by the traveling condition recognition device; a reaction force adjustment device that adjusts reaction force characteristics of a vehicle operating device based upon the risk potential calculated by the risk potential calculation device; an external influence detection device that detects an external influence which will affect an operation of the vehicle operating device by a driver; and a reaction force correction device that corrects the reaction force characteristics of the vehicle operating device adjusted by the reaction force adjustment device, based upon detection results obtained by the external influence detection device.

A driving assist system for a vehicle according to the present invention comprises a traveling condition recognition means for detecting a state of the vehicle and a traveling environment of the vehicle; a risk potential calculation means for calculating a risk potential present around the vehicle based upon detection results obtained by the traveling condition recognition means; a reaction force adjustment means for adjusting reaction force characteristics of a vehicle operating device based upon the risk potential calculated by the risk potential calculation means; an external influence detection means for detecting an external influence which will affect an operation of the vehicle operating device by a driver; and a reaction force correction means for correcting the reaction force characteristics of the vehicle operating device adjusted by the reaction force adjustment means, based upon detection results obtained by the external influence detection means.

A vehicle driving assist method according to the present invention detects a state of a vehicle and a traveling environment of the vehicle; calculates a risk potential present around the vehicle based upon the state of the vehicle and the traveling environment of the vehicle; adjusts reaction force characteristics of a vehicle operating device based upon the risk potential; detects an external influence which will affect an operation of the vehicle operating device by a driver; and corrects the reaction force characteristics of the vehicle operating device adjusted according to the risk potential, based upon the external influence.

A vehicle according to the present invention comprises a traveling condition recognition device that detects a state of the vehicle and a traveling environment of the vehicle; a risk potential calculation device that calculates a risk potential present around the vehicle based upon detection results obtained by the traveling condition recognition device; a reaction force adjustment device that adjusts reaction force characteristics of a vehicle operating device based upon the risk potential calculated by the risk potential calculation device; an external influence detection device that detects an external influence which will affect an operation of the vehicle operating device by a driver; and a reaction force correction device that corrects the reaction force characteristics of the vehicle operating device adjusted by the reaction force adjustment device, based upon detection results obtained by the external influence detection device.

BRIEF DESCRIPTION OF THE DRAWINGS

FIGS. 26A–26C illustrate the steering reaction force control implemented in scene 4; and FIG. 27 presents a flowchart of the steering reaction force control processing executed in the third embodiment.

DESCRIPTION OF THE PREFERRED EMBODIMENTS

First Embodiment

Figure 1:
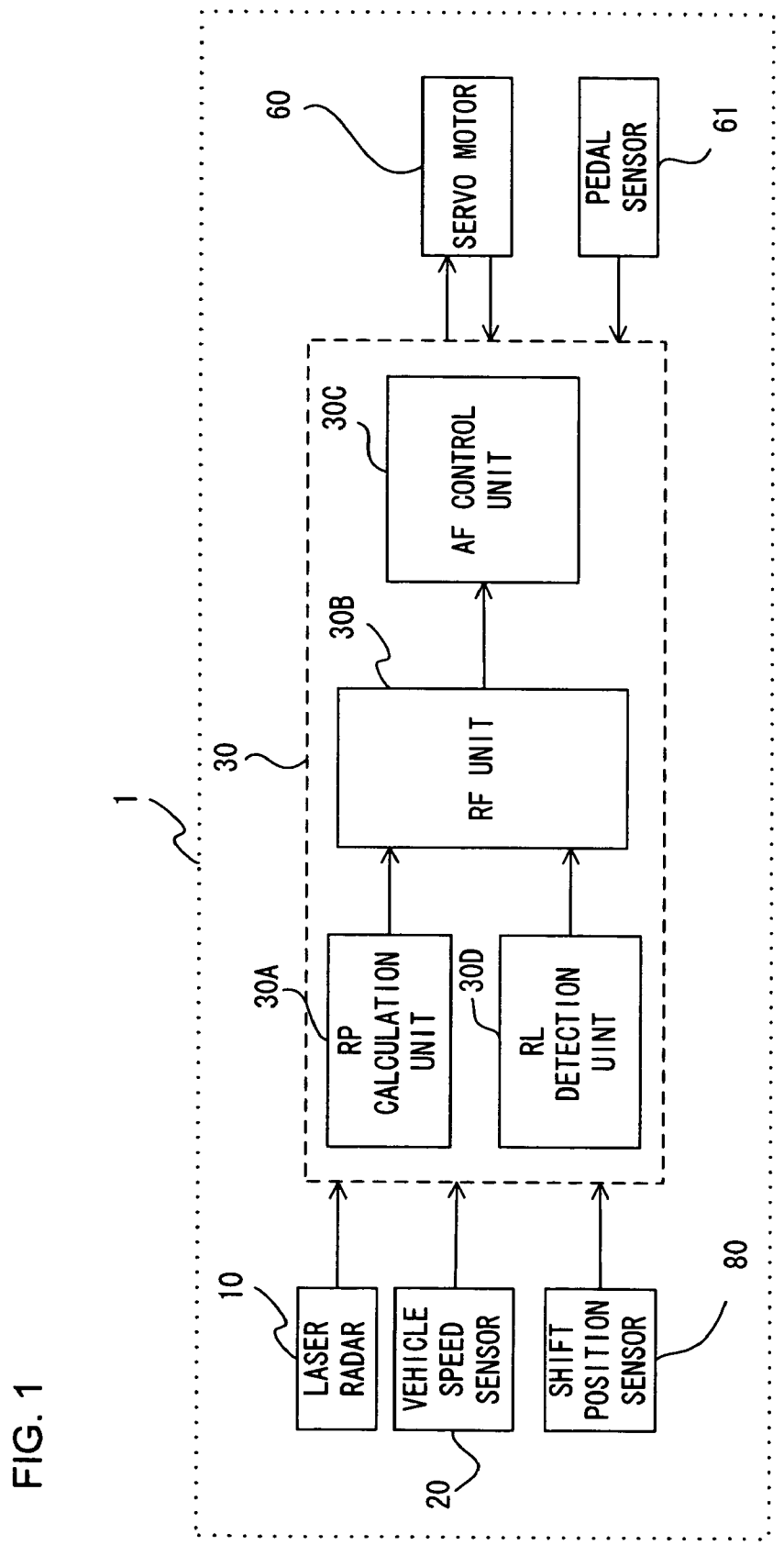
FIG. 1 shows the system configuration of the driving assist system for a vehicle achieved in a first embodiment of the present invention.
Figure 2:
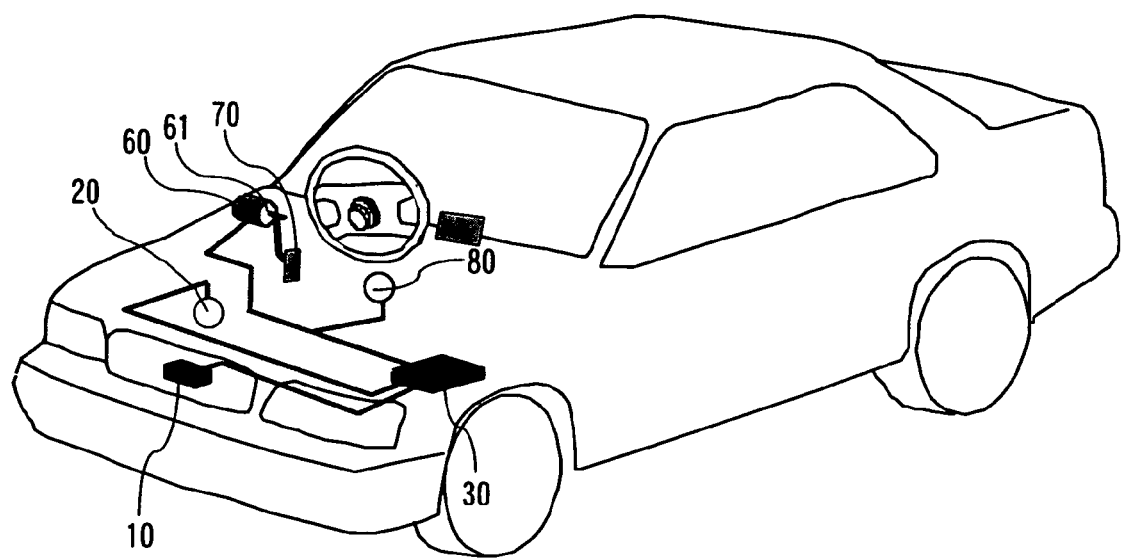
FIG. 2 shows the structure of a vehicle equipped with the driving assist system achieved in the first embodiment.

The driving assist system achieved in the first embodiment of the present invention is now explained in reference to the drawings. FIG. 1 shows the system configuration of a driving assist system 1 achieved in the first embodiment and FIG. 2 illustrates the structure of a vehicle equipped with the driving assist system 1.

First, the structure of the driving assist system 1 is explained. A laser radar 10, which may be mounted at the front grille or the bumper of the vehicle, scans an area ahead of the vehicle by propagating infrared pulses along the horizontal direction. The laser radar 10 measures reflected waves of the infrared pulses reflected from a plurality of reflecting objects (normally, the rear end of the preceding vehicle and the like) present ahead of the vehicle and detects the distance (a vehicle distance) and the relative speed to the preceding vehicle based upon the length of time that the reflected waves take to reach the laser radar 10. The vehicle distance and the relative speed thus detected are output to a controller 30. The front area scanned by the laser radar 10 ranges over approximately 6 degrees to each side of the longitudinal centerline of the vehicle and the laser radar 10 detects obstacles present within this range.

A vehicle speed sensor 20 detects the traveling speed at which the vehicle is currently traveling based upon the rotational rate or the like of the wheels and outputs the detected vehicle speed to the controller 30. A shift position sensor 80 detects a position of a gear shift lever (not shown) and outputs the detected shift position to the controller 30.

The controller 30, comprising a CPU and CPU peripheral components such as a ROM and a RAM. The controller 30 constitutes a RP calculation unit (a RP calculation unit) 30A, a reaction force calculation/correction unit (a RF unit) 30B, an accelerator pedal reaction force control unit (an AF control unit) 30C and a RL detection unit (a RL detection unit) 30D by adopting a specific software mode at the CPU.

The RP calculation unit 30A calculates a risk potential (RP) attributable to the state in which the vehicle is traveling and the surrounding environment based upon the signals input from the laser radar 10 and the vehicle speed sensor 20. The RP calculated at the RP calculation unit 30A is output to the RF unit 30B.

A servomotor 60 and a pedal sensor 61 are connected via a link mechanism to an accelerator pedal 70. The pedal sensor 61 detects a position of the accelerator pedal 70, in other words, an operation amount S by which the accelerator pedal 70 is depressed, which has been converted to a rotational angle of the servomotor 60 via the link mechanism. The pedal sensor 61 outputs the detected operation amount S to the controller 30.

In conformance to a signal input from the RF unit 30B, the AF control unit 30C calculates an accelerator pedal reaction force F to be generated at the accelerator pedal 70. Then, the AF control unit 30C controls the torque generated at the servomotor 60 and the rotational angle of the servomotor 60 so as to achieve the accelerator pedal reaction force F that has been calculated and thus controls the reaction force generated at the accelerator pedal 70 arbitrarily. It is to be noted that in a normal situation in which the accelerator pedal reaction force control is not implemented, the accelerator pedal reaction force characteristics are set so that, for instance, the accelerator pedal reaction force F increases linearly as the operation amount S becomes larger. The normal accelerator pedal reaction force characteristics may be achieved by a spring force imparted by a torsion spring (not shown) provided at the center of the rotation of the accelerator pedal 70.

The RL detection unit 30D calculates a running resistance RL of the vehicle based upon the vehicle speed input from the vehicle speed sensor 20, the operation amount S input from the pedal sensor 61 and a shift position signal input from the shift position sensor 80. The running resistance RL calculated at the RL detection unit 30D is output to the RF unit 30B.

The RF unit 30B calculates a reaction force increase quantity (a reaction force adjustment quantity or a RF increase quantity) $\Delta F$ by which the pedal reaction force F generated at the accelerator pedal 70 should be increased based upon the RP calculated at the RP calculation unit 30A. Furthermore, the RF unit 30B corrects the RF increase quantity $\Delta F$ based upon the running resistance RL calculated at the RL detection unit 30D. It is to be noted that the running resistance RL is used as a reference when making a decision with regard to the driver's perception of the pedal reaction force F. Details of the accelerator pedal reaction force control are to be provided later.

Next, the operations executed by the driving assist system 1 in the first embodiment are explained.

The RP calculation unit 30A calculates a "time-to-contact" (TTC) and a "time headway" (THW) in relation to the preceding vehicle based upon the vehicle speed Vf, the preceding vehicle speed Va, the relative vehicle speed Vr and the relative distance D between the subject vehicle and the preceding vehicle. The TTC and the THW may be calculated by using (expression 1) and (expression 2) presented below. It is to be noted that the relative vehicle speed Vr is calculated as Vf−Va.

$$TTC = D/Vr \qquad \text{(expression 1)}$$

$$THW = D/Vf \qquad \text{(expression 2)}$$

The TTC is a physical quantity that indicates the current proximity between the subject vehicle and the preceding vehicle. The TTC is a value that indicates how many seconds after the subject vehicle will come into contact with the preceding vehicle if the current traveling state is sustained, i.e., if the relative vehicle speed Vr remains constant.

The THW is a value that indicates an estimated degree to which the TTC will be affected subsequently if the subject vehicle is trailing the preceding vehicle, i.e., following the preceding vehicle with a matching speed. It is to be noted that if the subject vehicle is trailing the preceding vehicle, the vehicle speed Vf is equal to the preceding vehicle speed Va, and thus, the preceding vehicle speed Va instead of the vehicle speed Vf may be used to calculate the THW.

The RP calculation unit 30A calculates the RP for the subject vehicle based upon the TTC and the THW. The RP is defined in (expression 3) presented below by using the reciprocal 1/TTC of the TTC value and the reciprocal 1/THW of the THW value.

$$RP = a/THW + p/TTC \qquad \text{(expression 3)}$$

a and b in the mathematical expression above are constants that may be set to, for instance, a=1 and b=8.

The RL detection unit 30D calculates the current acceleration ac of the subject vehicle based upon the vehicle speed Vf and then calculates the torque that is actually generated (the actual torque) Tr at the subject vehicle. The actual torque Tr may be calculated by using (expression 4) below, for instance, by using a unit load per travel wheel Wf and a tire radius Rt.

$$Tr = ac \cdot Wf \cdot Rt \qquad \text{(expression 4)}$$

In addition, the RL detection unit 30D calculates a command value (torque command value) Tc for the torque to be generated at the subject vehicle based upon the accelerator pedal operation amount S and the shift position. Values that may be assumed for the torque command value Tc should be set in advance in a map in relation to the operation amount S and the shift position. The RL detection unit 30D calculates the running resistance RL of the subject vehicle as the difference between the actual torque and the torque Tr command value Tc. The running resistance RL is defined in (expression 5) presented below.

$$RL = Tc - Tr \qquad \text{(expression 5)}$$

By calculating the running resistance RL in this manner, an external influence, which is likely to affect the driver's perception and also affect the driver's operation of a vehicle operating device, such as the accelerator pedal 70 can be detected. Such an external influence likely to affect the driver's perception may be, for instance, the state of pedal depression. In this example, the state of pedal depression is estimated in correspondence to the running resistance RL of the subject vehicle.

The driver's perception of the pedal reaction force F changes in conformance to the state of the depression of the accelerator pedal 70. When the driver depresses the accelerator pedal 70 purposefully, the driver's perception is active and thus the driver senses any change in the pedal reaction force F keenly. When the accelerator pedal 70 is held in the depressed position, on the other hand, the driver's perception is passive and not as keen. While the driver brings the accelerator pedal 70 back to the released position, the driver's perception becomes dulled and thus it becomes more difficult for the driver to sense a change in the pedal reaction force F.

Figure 3:
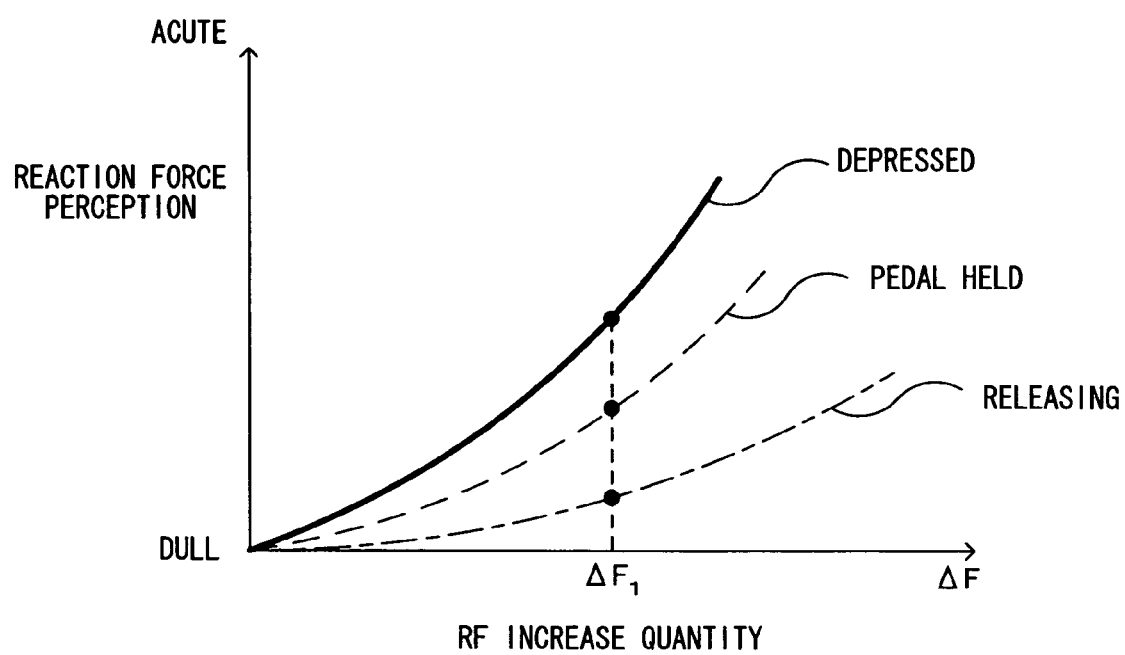
FIG. 3 shows the relationship between the extent to which the reaction force increases and the driver's perception of the pedal reaction force, which varies in correspondence to the degree of pedal depression.

FIG. 3 presents an example of the relationship between the RF increase quantity ΔF by which the reaction force is increased at the accelerator pedal 70 and the driver's perception of the pedal reaction force F. As shown in FIG. 3, at a given value ΔF1 of the RF increase quantity ΔF, the driver senses the pedal reaction force F more keenly while pressing down on the accelerator pedal 70 (indicated by a solid line), compared to while he is holding the accelerator pedal 70 in the depressed state (indicated by a broken line) or while the accelerator pedal 70 is brought back to the released position (indicated by a one-point chain line). Namely, the driver's perception of the pedal reaction force F is keener while the accelerator pedal 70 is held down compared to while the accelerator pedal 70 is being released. And, the driver's perception is also keener while he is pressing down on the accelerator pedal 70 compared to while the accelerator pedal 70 is held down.

Accordingly, the RF increase quantity ΔF by which the pedal reaction force F is to be increased is corrected in conformance to the state of the depression of the accelerator pedal 70 so as to execute the accelerator pedal reaction force control by reflecting the current state of the driver's perception in the first embodiment of the present invention. In the example, the running resistance RL is used to estimate the state of depression of the accelerator pedal 70, as mentioned earlier.

Figure 4A:
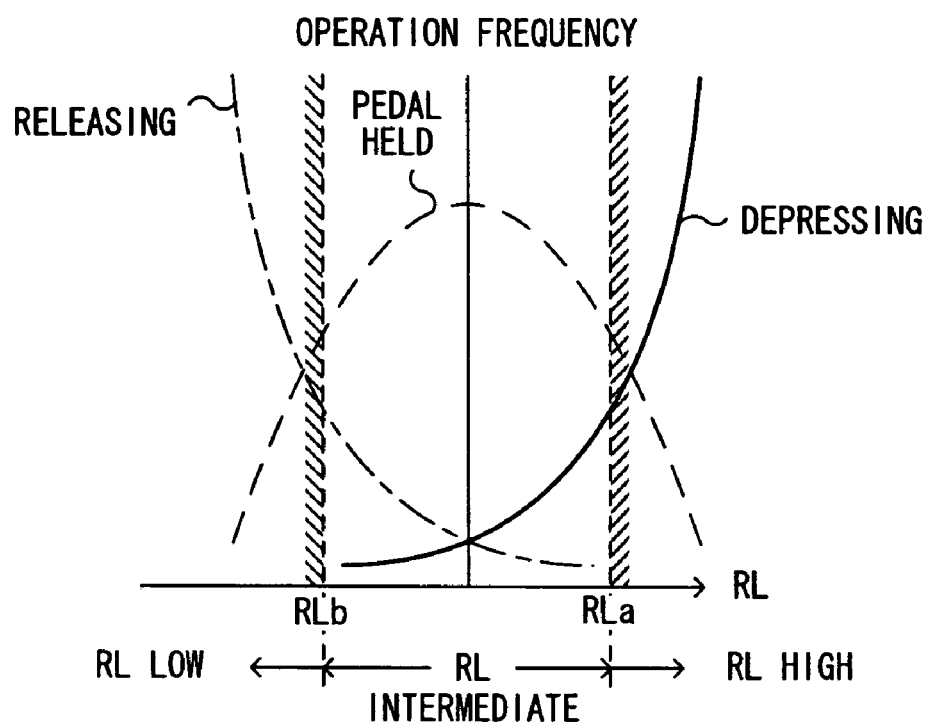
FIG. 4A shows the relationship between the running resistance and the accelerator pedal depression state.
Figure 4B:
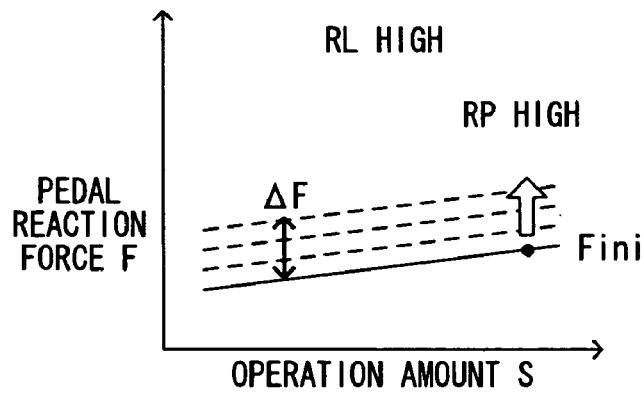
FIGS. 4B~4D provide the outlines of the accelerator pedal reaction force control implemented in conformance to the level of the running resistance.
Figure 4C:
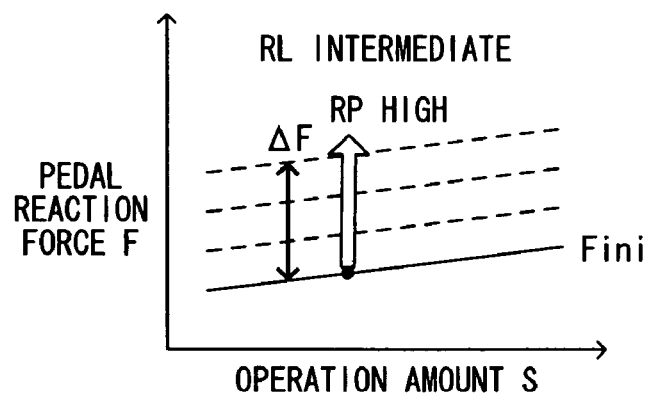
Figure 4D:
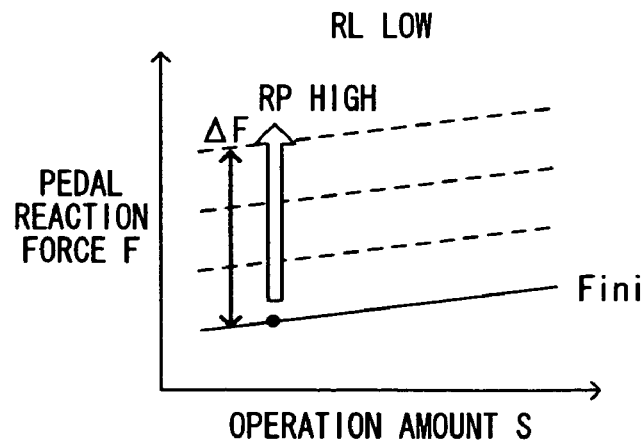

FIG. 4A shows an example of the relationship between the running resistance RL and the depressed state of the accelerator pedal 70 in terms of the frequency of pedal operation in each depressed state. FIGS. 4B~4D outline the accelerator pedal reaction force control implemented in correspondence to the running resistance RL, with a solid line Fini representing the normal accelerator pedal reaction force characteristics whereby the pedal reaction force F changes in conformance to the operation amount S.

As shown in FIG. 4A, the driver tends to step on the accelerator pedal 70 more readily when the level of the running resistance RL is high, i.e. the actual torque Tr is smaller than the torque command value Tc. The driver also tends to release the accelerator pedal 70 when the level of the running resistance RL is small, i.e. the actual torque Tr is larger than the torque command value Tc. In addition, when the driving resistance RL is at an intermediate level, i.e. when the actual torque Tr is substantially equal to the torque command value Tc, the driver tends to hold the position of the accelerator pedal 70.

In other words, it is estimated that the driver perceives the pedal reaction force F more keenly when the running resistance RL is high, whereas the driver's perception of the pedal reaction force F is dulled as the running resistance RL becomes lower. In this example, appropriate values are set in advance for a threshold RLa used to judge that the running resistance RL is high and a threshold RLb used to judge that the running resistance RL is low. The running resistance RL is assumed to be at an intermediate level when the running resistance RL satisfies RLb≦RL≦RLa.

It should be understood that the vehicle may be traveling uphill, for instance, when the running resistance RL is high, whereas the vehicle may be traveling downhill when the running resistance RL is low. In addition, the vehicle may be traveling on a flat road when the running resistance RL is at an intermediate level. Accordingly, a road condition, e.g., uphill or downhill, can be regarded as an external influence that affects the operations performed by the driver. Such an external influence affects the driving operations performed by the driver and, more specifically, it affects the manner in which the driver depresses the accelerator pedal 70 and ultimately affects the driver's perception of the pedal reaction force F as well.

The RF unit 30B calculates the RF increase quantity ΔF to be incorporated into the normal accelerator pedal reactio n force characteristics in correspondence to the RP. The RF increase quantity ΔF may be calculated by using, for instance, (expression 6) presented below.

$$\Delta F = k \times RP^n \quad \text{(expression 6)}$$

k in the expression above represents a constant set to an appropriate value. As indicated above, the RF increase quantity ΔF increases exponentially as the RP increases.

The RF unit 30B then corrects the RF increase quantity ΔF in correspondence to the running resistance RL as shown in FIGS. 4B~4D so as to ensure that the driver's perception of the pedal reaction force remains constant at all times. Namely, for a given level of RP, it reduces the RF increase quantity ΔF if the running resistance RL is high and increases the RF increase quantity ΔF if the running resistance RL is low. In this example, the RF increase quantity ΔF is corrected by adjusting the exponent n in the (expression 6) in conformance to the level of the running resistance RL.

Figure 5:
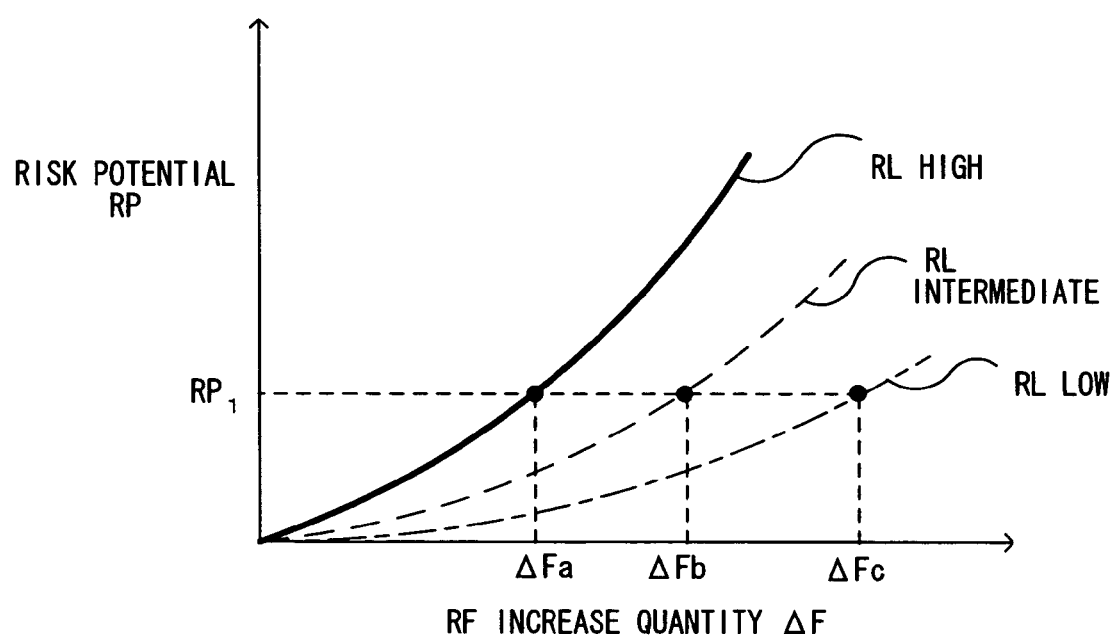
FIG. 5 shows the relationship between the extent to which reaction force increases and the risk potential, which varies in correspondence to the level of the running resistance.

FIG. 5 shows the relationship between the RF increase quantity ΔF and the RP, which vary as the running resistance RL changes. FIG. 5 shows the characteristics of the RF increase quantity ΔF when the running resistance RL is high (RL>RLa) by a solid line, the characteristics of the RF increase quantity ΔF when the running resistance level is intermediate (RLb≦RL≦RLa) by a broken line, and the characteristics of the RF increase quantity ΔF when the running resistance RL is low (RL<RLb) by a one-point chain line. n1 set for the exponent n when the running resistance RL is high, n2 set for the exponent n when the running resistance level is intermediate and n3 set for the exponent n when the running resistance RL is low respectively assume appropriate value settings so as to achieve a relationship expressed as n1<n2<n3.

Thus, when the RP is at a given level RP1, the RF increase quantity ΔF is set to ΔFa if the running resistance RL is high, the RF increase quantity ΔF is set to ΔFb if the running resistance level is intermediate and the RF increase quantity ΔF is set to ΔFc if the running resistance RL is low with ΔFa, ΔFb and ΔFc satisfying a relationship expressed as ΔFa<ΔFb<ΔFc.

As described above, the RF unit 30B corrects the RF increase quantity ΔF by adjusting the exponent n in (expression 6) used to calculate the RF increase quantity ΔF in correspondence to the level of the running resistance RL input from the RL detection unit 30D. Then it outputs the corrected value to the ΔF control unit 30C so that the servomotor 60 is controlled based upon the corrected value. As a result, pedal reaction force control that ensures that the driver's perception of the level of the pedal reaction force F generated in correspondence to the RP remains constant at all times regardless of the level of the running resistance RL is achieved.

Figure 6:
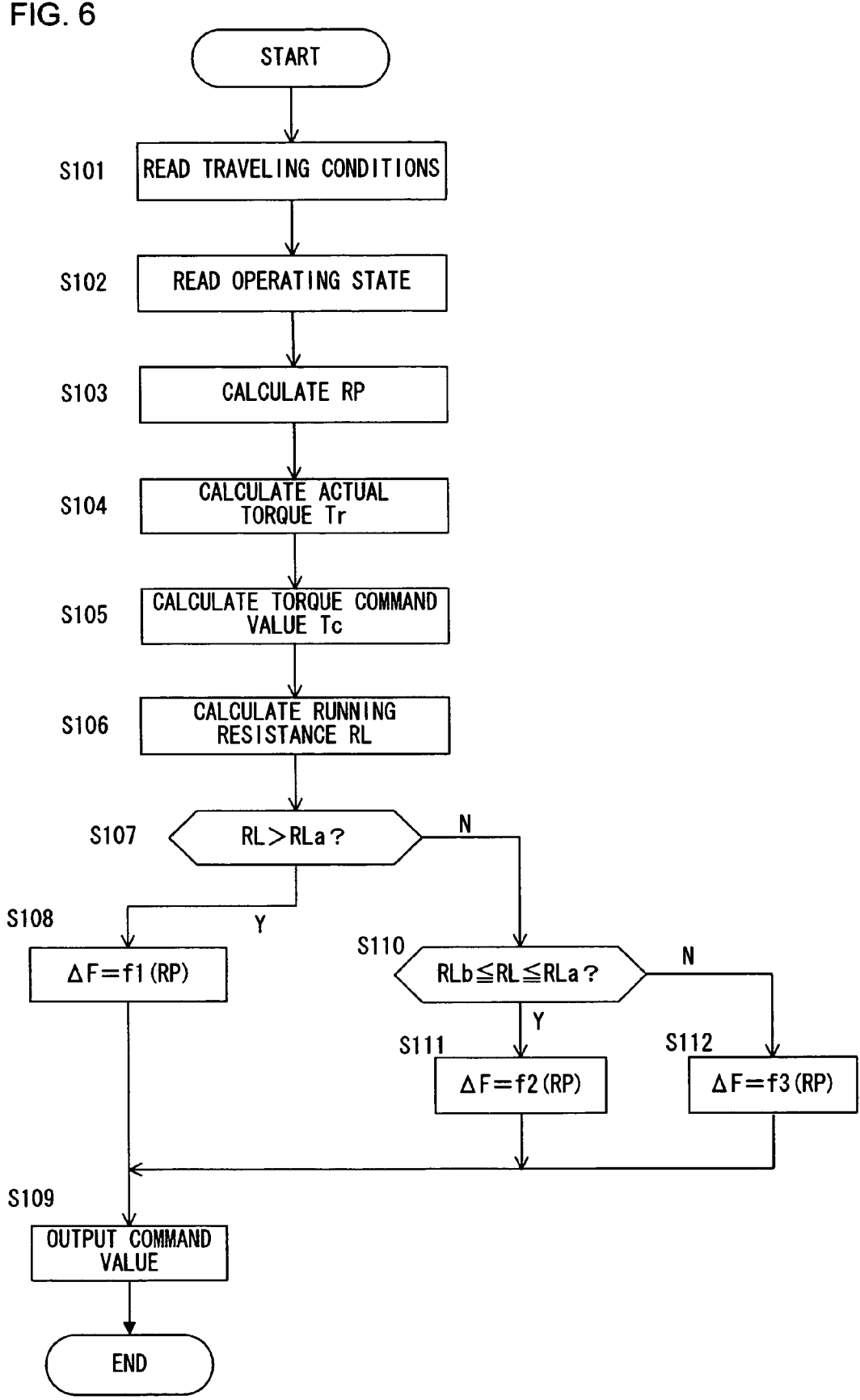
FIG. 6 presents a flowchart of the pedal reaction force control processing executed in the first embodiment.

Next, the processing executed to calculate the RP and the running resistance RL and the processing executed to implement the accelerator pedal reaction force control are explained in reference to the flowchart presented in FIG. 6. It is to be noted that these processing procedures are executed continuously at the controller 30 at predetermined time intervals of, e.g., 50 msec.

In step S101, the traveling conditions such as the vehicle speed Vf, the vehicle distance D and the relative vehicle speed Vr to the preceding vehicle, and the preceding vehicle speed Va detected by the laser radar 10 and the vehicle speed sensor 20 are read. In step S102, the operating conditions detected by the pedal sensor 61 and the shift position sensor 80, i.e., the accelerator pedal operation amount S and the shift position of the gear shift sensor, are read.

In step S103, the TTC and the THW are calculated by using (expression 1) and (expression 2) based upon the traveling conditions having been read in step S101 and also, the RP is calculated for the subject vehicle by using (expression 3).

In step S104, the actual torque Tr is calculated based upon the vehicle speed Vf read in step S101. In step S105, the torque command value Tc is calculated based upon the operation amount S and the shift position read in step S102. In step S106, the running resistance RL is calculated by using (expression 5).

In step S107, a decision is made as to whether or not the running resistance RL that has been calculated in step S106 is larger than the threshold RLa. If an affirmative decision is made in step S107, the operation proceeds to step S108. In step S108, the RF increase quantity ΔF by which the accelerator pedal reaction force F is to increase when the running resistance RL is high (RL>RLa) is calculated. The RF increase quantity ΔF is defined in (expression 7) presented below when the running resistance RL is higher than RLa.

$$\Delta F = f1(RP) = k \times RP^{n1} \quad \text{(expression 7)}$$

It is to be noted that (expression 7) differs from (expression 6) presented earlier in that the exponent n in (expression 6) is changed to n1.

In step S109, a command is output to the AF control unit 30C so as to increase the accelerator pedal reaction force by the RF increase quantity ΔF calculated in step S108. The AF control unit 30C then controls the servomotor 60 so as to generate the pedal reaction force F achieved by incorporating the RF increase quantity ΔF into the normal accelerator pedal reaction force characteristics.

If, on the other hand, a negative decision is made in step S107, the operation proceeds to step S110. In step S110, a decision is made as to whether or not the running resistance RL is equal to or smaller than the threshold value RLa and also equal to or greater than the threshold value RLb. If an affirmative decision is made in step S110, the operation proceeds to step S111. In step S111, the reaction force increase quantity ΔF to be generated when the running resistance RL is at an intermediate level (RLb<RL<RLa) is calculated. The RF increase quantity ΔF calculated at this time is defined in (expression 8) presented below.

$$\Delta F = f2(RP) = k \times RP^{n2} \quad \text{(expression 8)}$$

It is to be noted that (expression 8) differs from (expression 6) presented earlier in that the exponent n in (expression 6) is changed to n2.

If a negative decision is made in step S110, the operation proceeds to step S112. In step S112, the RF increase quantity ΔF to be generated when the running resistance RL is low (RL<RLb) is calculated. The RF increase quantity ΔF calculated at this time is defined in (expression 9) presented below.

$$\Delta F = f3(RP) = k \times R^{n3} \quad \text{(expression 9)}$$

It is to be noted that (expression 9) differs from (expression 6) presented earlier in that the exponent n in (expression 6) is changed to n3.

In step S109, a command is output to the AF control unit 30C so as to increase the accelerator pedal reaction force by the RF increase quantity ΔF that has been calculated.

Figure 7:
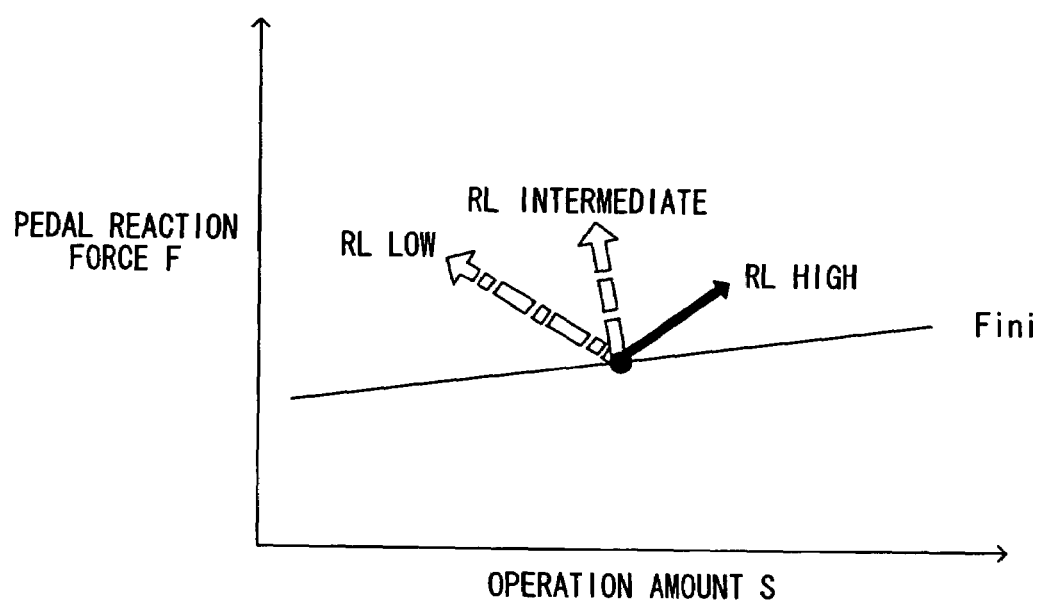
FIG. 7 shows the relationship between the accelerator operation amount and the pedal reaction force, which varies in correspondence to the level of the running resistance.

FIG. 7 illustrates the function of the driving assist system 1 achieved in the first embodiment. The arrows in FIG. 7 each schematically indicate the relationship between the RF increase quantity ΔF and the operation amount S corresponding to a given level of running resistance RL.

As shown in FIG. 7 and FIGS. 4A–4D described earlier, the RF increase quantity ΔF, by which the accelerator pedal reaction force is increased when the driver is in a more perceptive state, e.g., when the driver is purposefully stepping on the accelerator pedal 70 and the driving resistance RL is high, is smaller than the RF increase quantity ΔF generated when the running resistance RL is at an intermediate level with the accelerator pedal 70 held in a depressed state. In addition, the RF increase quantity ΔF by which the reaction force is increased when the driver is in a less perceptive state, e.g., when the accelerator pedal 70 is being released is greater than the RF increase quantity ΔF corresponding to an intermediate running resistance level. As a result, regardless of the level of the running resistance RL, i.e., regardless of the state of depression of the accelerator pedal 70, the driver is allowed to perceive substantially the same level of pedal reaction force F so as to recognize the RP accurately when the RP is at a given level.

The following advantages are achieved in the first embodiment explained above.

(1) The RP present around the subject vehicle is calculated based upon the state of the subject vehicle and the traveling environment around the subject vehicle, and the reaction force characteristics to operation of the vehicle operating device are adjusted in correspondence to the RP. Since any external influence that will affect the operation of the vehicle operating devised by the driver is detected and the reaction force characteristics are corrected in correspondence to the external influence during this process, the RP can be accurately communicated in a manner reflecting the state of the driver's perception to assist the driver to operate a vehicle.

(2) Since the reaction force characteristics of the accelerator pedal 70 are adjusted in conformance to the RP, the RP is communicated with ease to the driver as an accelerator pedal reaction force.

(3) The inclination of the lane in which the subject vehicle is traveling is detected as an external influence and the accelerator pedal reaction force characteristics are corrected in correspondence to the inclination. Thus, the pedal reaction force F corresponding to a given level of RP present along the longitudinal direction relative to the subject vehicle can be sensed by the driver with a substantially constant degree of acuity. Accordingly, the RP can be communicated to the driver accurately to assist the driver operation.

(4) The RF increase quantity ΔF is calculated for the accelerator pedal 70 based upon the RP. The RF increase quantity ΔF is corrected so that the RF increase quantity ΔF is lowered when the subject vehicle is traveling uphill, or so that the RF increase quantity ΔF is raised when the subject vehicle is traveling downhill. As a result, the pedal reaction force F generated when the subject vehicle is traveling uphill and the pedal reaction force F generated when the vehicle is traveling downhill can be sensed by the driver with substantially equal degrees of acuity so as to communicate the RP to the driver accurately.

(5) As an external influence that will affect the operation of the vehicle operating device by the driver, the driver's perception of the reaction force of the vehicle operating device is detected. The RP can be communicated to the driver in a manner reflecting the level of the driver's perception.

(6) The state of depression of the accelerator pedal 70 is detected to judge the driver's perception. The driver's perception of the pedal reaction force F is judged to be keen when the extent to which the pedal is depressed increases whereas the driver's perception of the pedal reaction force F is judged to be dull when the extent to which the pedal is depressed decreases. As a result, the driver's perception can be judged with ease. In addition, since the accelerator pedal 70, through which the driver senses the reaction force with varying levels of acuity is controlled in conformance to the RP, the RP can be communicated to the driver effectively.

(7) Since the state of the depression of the accelerator pedal 70 is estimated in correspondence to the running resistance RL of the subject vehicle, the driver's perception can be judged with ease.

Second Embodiment

Next, the driving assist system achieved in the second embodiment of the present invention is explained in reference to the drawings. While the RP is communicated to the driver through the accelerator pedal reaction force control in the first embodiment explained above, a RP present along the lateral direction relative to the subject vehicle is communicated to the driver by controlling the steering reaction force generated at the steering wheel in the second embodiment.

Figure 8:
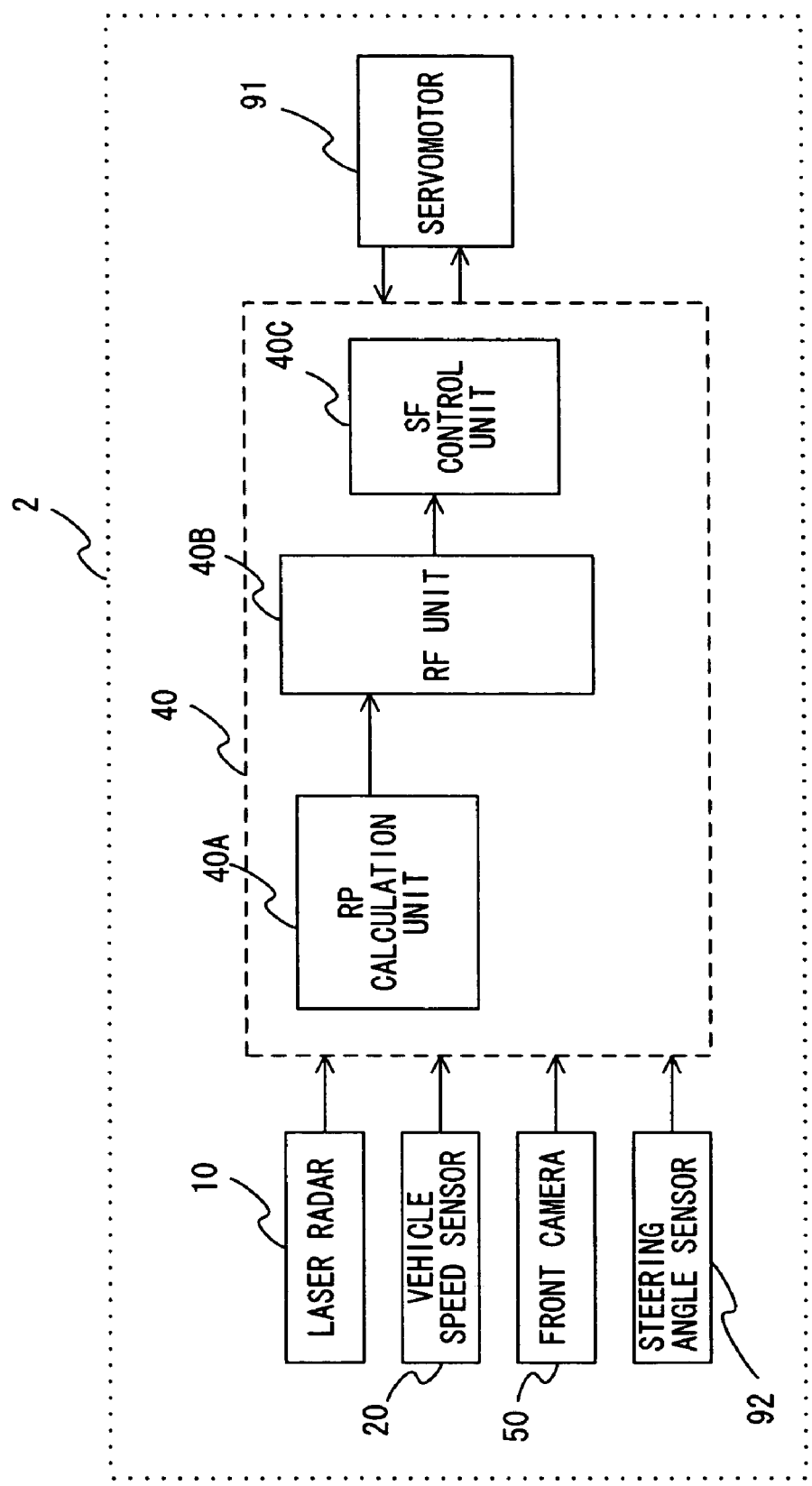
FIG. 8 shows the system configuration of the driving assist system for a vehicle achieved in a second embodiment of the present invention.
Figure 9:
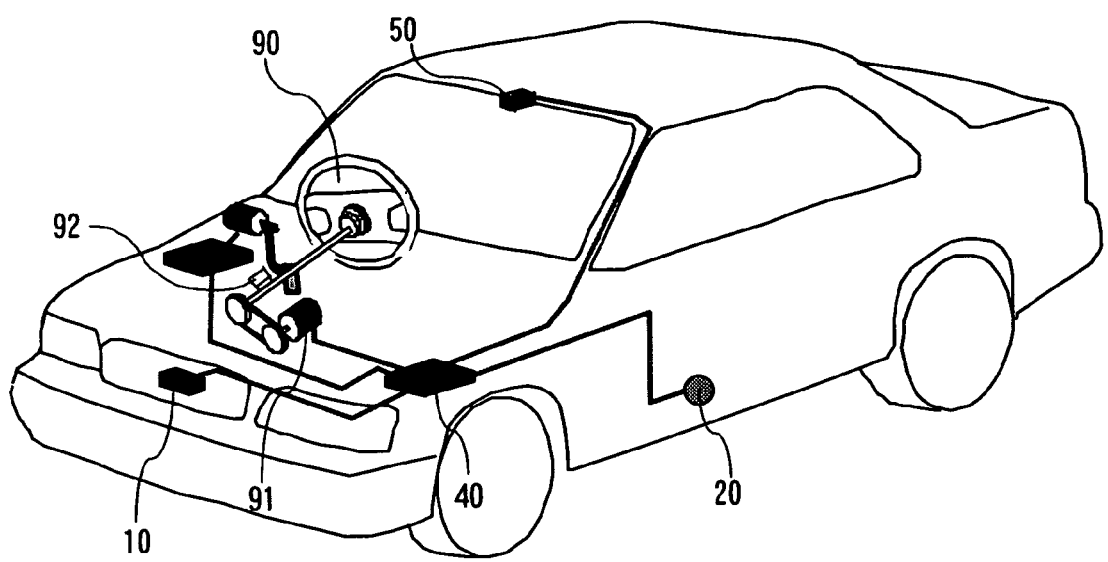
FIG. 9 shows the structure of a vehicle equipped with the driving assist system achieved in the second embodiment.

FIG. 8 shows the system configuration of the driving assist system 2 achieved in the second embodiment and FIG. 9 shows the structure of a vehicle equipped with the driving assist system 2. In FIGS. 8 and 9, the same reference numerals are assigned to components having functions similar to those in the first embodiment. The following explanation focuses on the differences from the first embodiment.

A laser radar 10 detects any obstacle that is present to the front left or the front right of the vehicle as well as any obstacle present straight ahead of the vehicle within its scanning range. The laser radar 10 detects the distance and the relative speed to, for instance, a vehicle on an adjacent lane or an oncoming vehicle, and the direction in which the other vehicle is present (the relative angle).

A front camera 50, which may be a compact CCD camera or CMOS camera mounted at the top of the windshield. The front camera 50 detects the condition of the road ahead of the subject vehicle as an image and outputs the image signal to a controller 40. The detection area of the front camera 50 is approximately 30 degrees to each side of the longitudinal centerline of the subject vehicle, and a view of the road ahead of the subject vehicle within this range is taken in as an image. The controller 40 ascertains obstacle conditions around the subject vehicle by executing image processing on the image signals input from the front camera 50.

A steering angle sensor 92 is an angle sensor mounted, for instance, near the steering column or a steering wheel 90. The steering angle sensor 92 detects the rotational angle, i.e., the steering angle, of the steering wheel 90 and outputs the detected angle to the controller 40. The controller 40 ascertains the operating state of the subject vehicle based upon the steering angle input from the steering angle sensor 92.

The controller 40 implements steering reaction force control in correspondence to the RP based upon the obstacle condition around the subject vehicle and the operating state of the subject vehicle.

A risk potential calculation unit (a RP calculation unit) 40A calculates the RP for the subject vehicle based upon the signals input from the laser radar 10, a vehicle speed sensor 20 and the front camera 50. During this process, the RP calculation unit 40A calculates the RP present along the lateral direction relative to the subject vehicle by using the relative distance D to an obstacle present around the subject vehicle and the relative speed Vr. The lateral RP thus calculated is output to a reaction force calculation/correction unit (a RF unit) 40B.

A steering reaction force control unit (a SF control unit) 40C controls the torque generated at a servomotor 91 built into the steering system of the subject vehicle in response to a command issued by the RF unit 40B. In response to a command issued by the SF control unit 40C, the servomotor 91 arbitrarily controls the steering reaction force generated while the driver operates the steering wheel 90 by controlling the torque to be generated.

Next, the operations executed by the driving assist system 2 in the second embodiment are explained.

As the steering wheel 90 is operated in the traveling vehicle, a self-aligning torque is generated at the tires and thus, a steering reaction force that will act so as to reset the steering wheel 90 to the neutral position is generated. In this example, a reaction force adjustment quantity corresponding to the lateral RP, relative to the subject vehicle is incorporated into the steering reaction force attributable to the self-aligning torque characteristics (SAT characteristics) to achieve control of the steering reaction force.

Figure 10A:
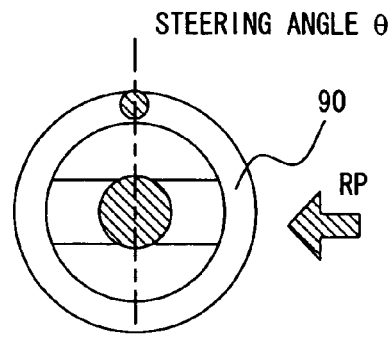
FIGS. 10A and 10B illustrate the basic principle of the steering reaction force control executed in the second embodiment.
Figure 10B:
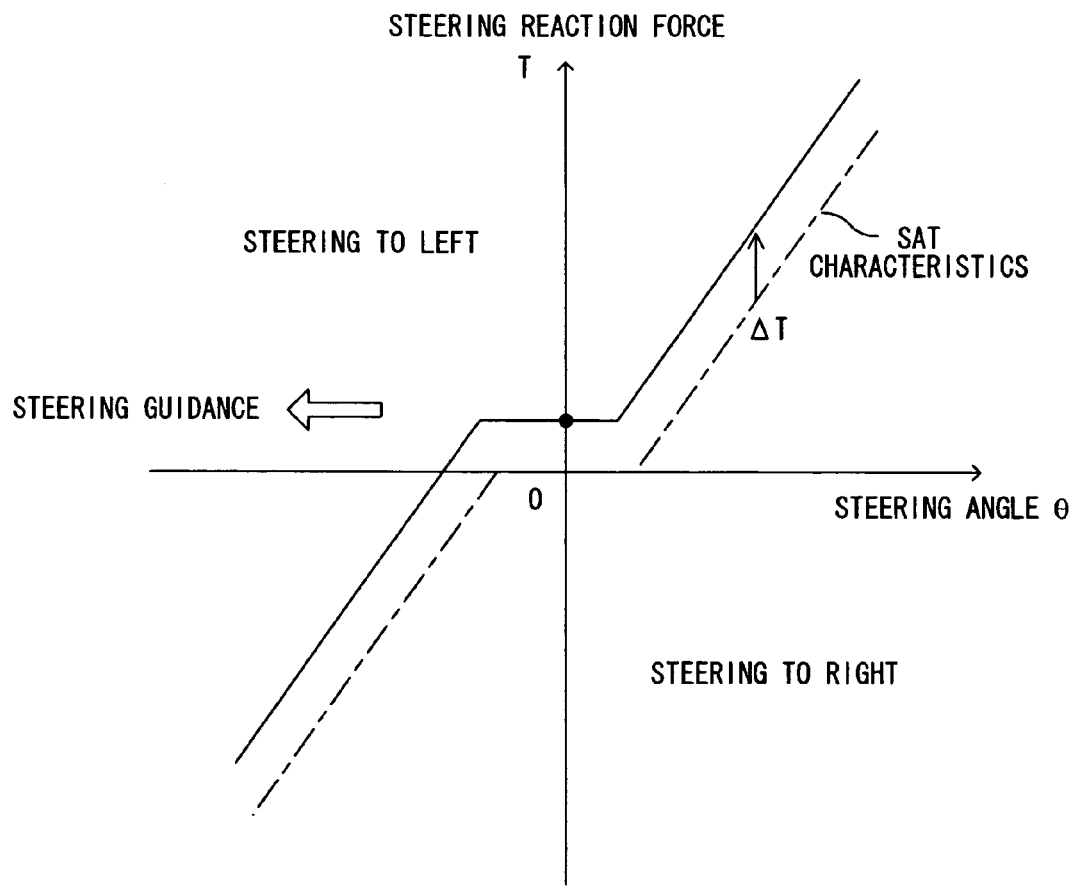
Figure 11A:
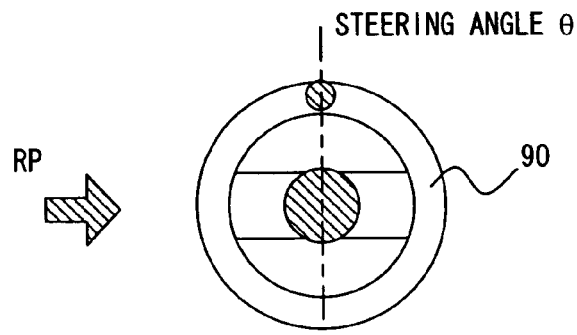
FIGS. 11A and 11B illustrate the basic principle of the steering reaction force control executed in the second embodiment.
Figure 11B:
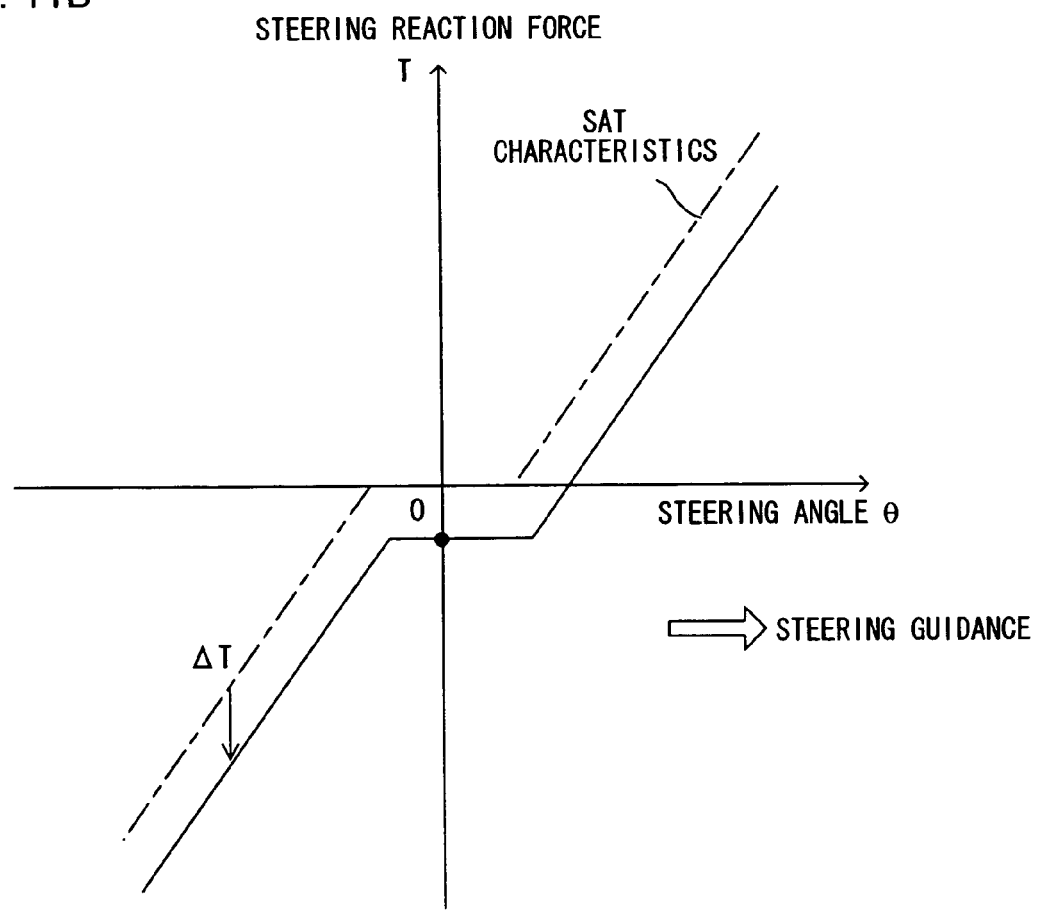

FIGS. 10A and 10B and FIGS. 11A and 11B illustrate the basic principle of the steering reaction force control achieved in the second embodiment. It is to be noted that FIGS. 10A and 11A each indicate the steering direction and a direction along which the RP is applied to the subject vehicle. In FIGS. 10B and 11B, the horizontal axis represents the steering angle $\theta$ which assumes positive values for steering the vehicle to the right and the vertical axis represents the steering reaction force T which assumes positive values in the direction along which the steering wheel, having been steered to the right, is reset to the neutral position. In FIGS. 10A~11B, the steering wheel 90 is at the neutral position and the current steering angle $\theta$ is 0. As shown in FIGS. 10B and 11B, the SAT characteristics indicated by the one-point chain line are such that the steering reaction force T increases as the steering angle $\theta$ becomes larger.

When there is a RP originating from the right of the subject vehicle, a specific reaction force adjustment quantity (a RF adjustment quantity) $\Delta Ta$ ($\Delta Ta \geq 0$) is incorporated into the SAT characteristics as shown in FIGS. 10A and 10B. As a result, the steering reaction force T is raised as the steering wheel 90 is turned to the right, whereas the steering reaction force T is lowered as the steering wheel is turned to the left as indicated by the solid line.

When there is a RP originating from the left of the subject vehicle, a specific RF adjustment quantity $\Delta Ta$ ($\Delta Ta < 0$) is incorporated into the SAT characteristics as shown in FIGS. 11A and 11B. As a result, the steering reaction force T is raised as the steering wheel 90 is turned to the left whereas the steering reaction force T is lowered as the steering wheel is turned to the right as indicated by the solid line.

As described above, if the vehicle is steered in the direction from which the RP originates, the RP is communicated to the driver by raising the level of the steering reaction force T. If, on the other hand, the vehicle is steered toward the opposite side from the RP, the steering reaction force T is lowered to prompt the driver to steer the vehicle in the direction along which the RP becomes lower. It is to be noted that the steering wheel 90 is stabilized the steering reaction force T is 0, and the steering angle $\theta$ for achieving the reaction force T=0 may be regarded as a recommended steering angle at which the driver is guided to steer the vehicle in the desirable direction.

When a steering operation is in progress, e.g., when the subject vehicle is traveling on a winding road, the self-aligning torque has already been generated, and for this reason, the RP cannot be recognized accurately even if the corresponding RF adjustment quantity $\Delta Ta$ is added into the steering reaction force T. Accordingly, various traveling conditions with respect to a vehicle traveling on a winding road are classified into four different scenes so that the RF adjustment quantity $\Delta Ta$ to be incorporated into the SAT characteristics is corrected differently in correspondence to each scene. It is to be noted that the direction along which the lane in which the subject vehicle is traveling curves (a curving direction) is judged by using, for instance, image information detected by the front camera 50 and the direction in which the steering wheel 90 is turned, i.e. the steering angle $\theta$.

Four traveling scenes are as follows:

Scene 1: A RP has originated from the right of the subject vehicle traveling in a right curve Scene 2: ARP has originated from the left of the subject vehicle traveling in a right curve Scene 3: A RP has originated from the right of the subject vehicle traveling in a left curve Scene 4: A RP has originated from the left of the subject vehicle traveling in a left curve The steering reaction force control implemented in scenes 1~4 is now explained.

(Scene 1)

Figure 12A:
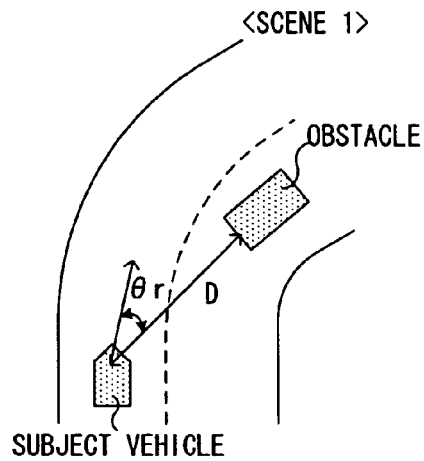
FIGS. 12A~12C illustrate the steering reaction force control implemented in scene 1.
Figure 12B:
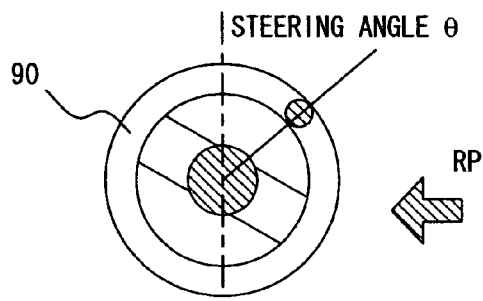
Figure 12C:
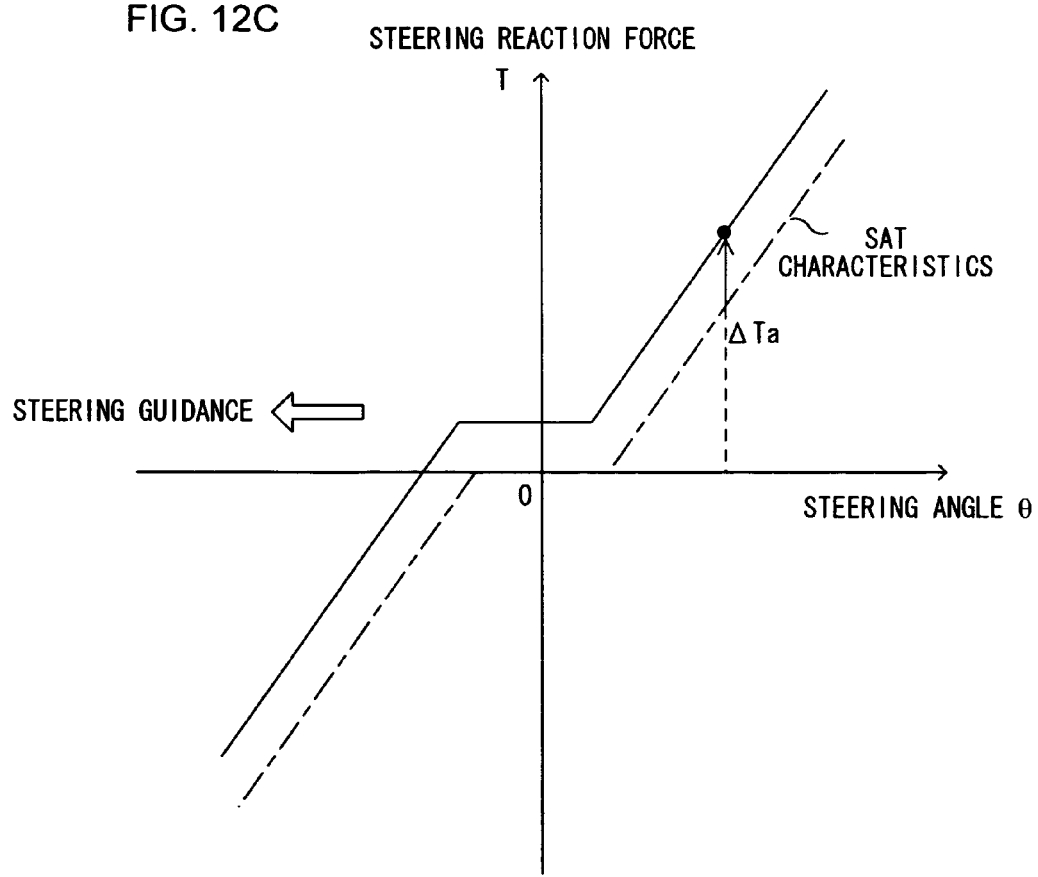

FIG. 12A shows a specific example of traveling conditions corresponding to scene 1. FIG. 12B shows the steering direction and the direction from which the RP originates in scene 1 and FIG. 12C shows the steering reaction force characteristics to the steering angle. As shown in FIG. 12A, an obstacle such as an oncoming vehicle is present to the front right of the subject vehicle while the subject vehicle is traveling in a right curve. This means that the direction in which the road curves and the direction in which the RP is present match in scene 1. Hereafter, the risk potential which is applied to the subject vehicle along a lateral direction is represented as a RPc.

The RP calculation unit 40A calculates the RPc present at the right of the subject vehicle traveling in the right curve based upon the distance D and the relative speed Vr between the subject vehicle and the oncoming vehicle, and the direction along which the obstacle is present in relation to the subject vehicle. The direction along which the obstacle is present is represented as the relative angle $\theta r$ between the subject vehicle and the obstacle in this example. While the relative angle $\theta r$ may assume a positive value when an obstacle is present to the right and may assume a negative value when an obstacle is present to the left, the RPc is calculated by using the absolute value of the relative angle $\theta r$ to simplify the explanation in the example.

The RPc corresponding to the obstacle present to the front right may be calculated, for instance, by using the TTC, in particular, by using the component of the TTC along the lateral direction relative to the subject vehicle. As explained earlier, the TTC represents the margin of time left before the subject vehicle comes into contact with the obstacle and is calculated by using (expression 1). The RPc may be defined in (expression 10) presented below.

$$RPc = (1/TTC) \times \sin \theta r \qquad \text{(expression 10)}$$

Figure 13:
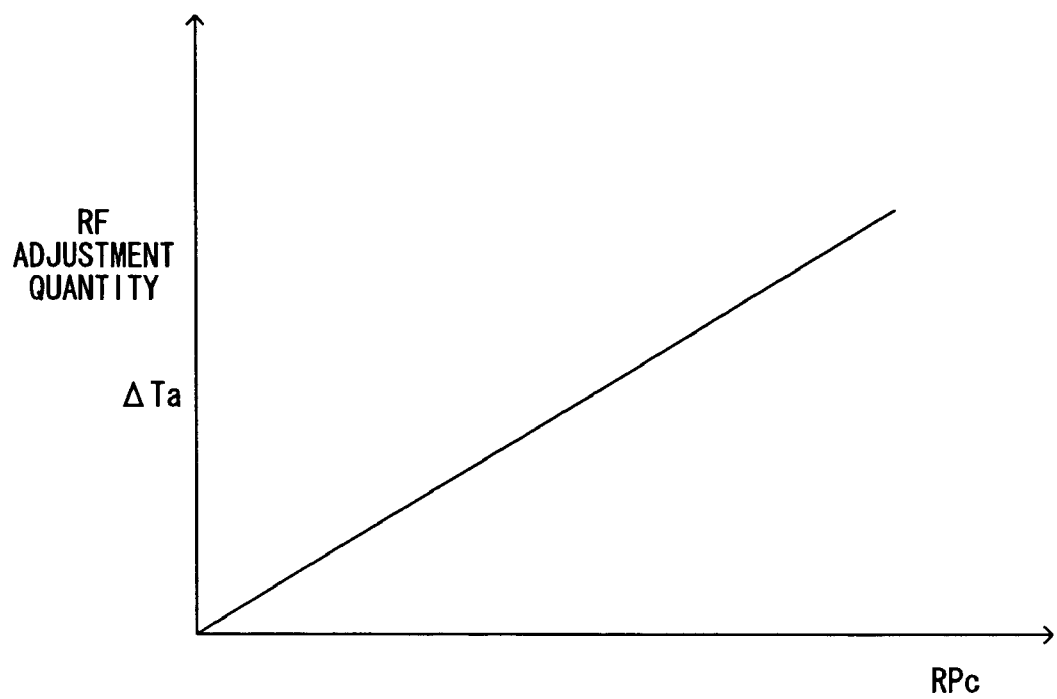
FIG. 13 shows the relationship between the risk potential and the reaction force adjustment quantity.

Based upon the RPc calculated at the RP calculation unit 40A, the RF unit 40B calculates the RF adjustment quantity $\Delta Ta$ to be incorporated into the SAT characteristics. FIG. 13 presents an example of the relationship between the RF adjustment quantity $\Delta Ta$ and the level of the RPc. The RF adjustment quantity $\Delta Ta$, which is defined as a function g1(RPc) of the RPc, increases as the level of the RPc rises as shown in FIG. 13. The RF adjustment quantity ΔTa can be defined in (expression 11) presented below.

$$\Delta Ta = +g1(RPc)$$
$$= +m \times RPc \quad \text{(expression 11)}$$

m in the expression above is a constant which is set to an appropriate value in advance.

The RF unit 40B outputs the calculated RF adjustment quantity ΔTa (ΔTa≧0) to be incorporated into the SAT characteristics to the SF control unit 40C which, in turn, implements the steering reaction force control by incorporating the RF adjustment quantity ΔTa into the SAT characteristics.

As shown by the solid line in FIG. 12C, the reaction force T to be generated for steering the vehicle to the right is raised and the reaction force T to be generated for steering the vehicle to the left is lowered by incorporating a constant RF adjustment quantity ΔTa into the SAT characteristics indicated by the one-point chain line in scene 1. It is to be noted that while the SAT characteristics change in correspondence to the vehicle speed, the RF adjustment quantity ΔTa corresponding to the RPc is added when the SAT characteristics change as well.

(Scene 2)

Figure 14A:
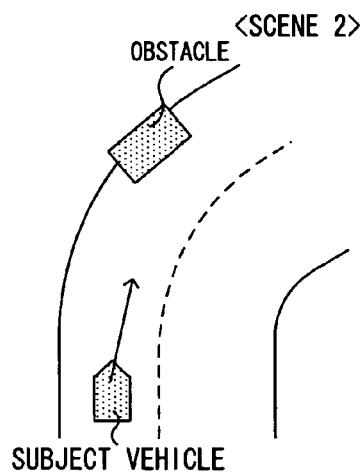
FIGS. 14A~14C illustrate the steering reaction force control implemented in scene 2.
Figure 14B:
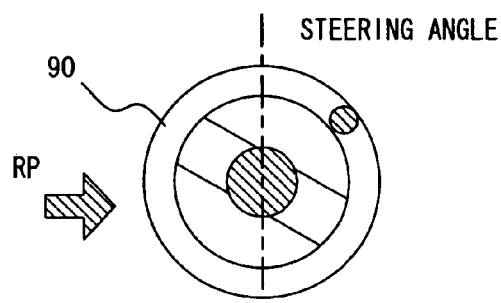
Figure 14C:
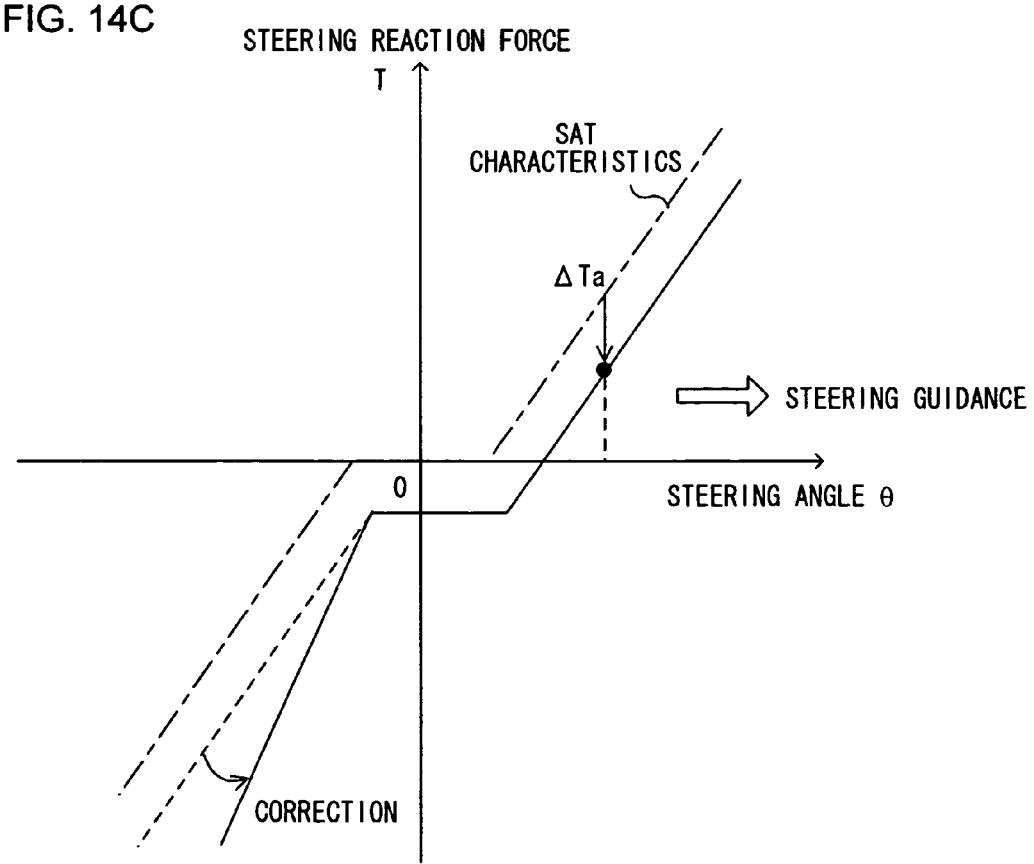

FIG. 14A shows a specific example of traveling conditions corresponding to scene 2. FIG. 14B shows the steering direction and the direction from which the RPc originates in scene 2 and FIG. 14C shows the steering reaction force characteristics to the steering angle. As shown in FIG. 14A, an obstacle such as a parked vehicle is present to the front left of the subject vehicle while the subject vehicle is traveling in a right curve. This means that the direction in which the road curves and the direction in which the RPc is present do not match in scene 2.

The RP calculation unit 40A calculates the RPc present to the left of the subject vehicle traveling in the right curve. As in scene 1 explained earlier, the RPc is calculated by using (expression 10). The RF unit 40B calculates the RF adjustment quantity ΔTa as (−m×RPc), ΔTa<0, corresponding to the RPc by using (expression 11).

The RF unit 40B incorporates the calculated RF adjustment quantity ΔTa (ΔTa<0) into the SAT characteristics as shown in FIG. 14C so as to set the steering reaction force characteristics corresponding to scene 2. Consequently, the steering reaction force T to be generated for steering the subject vehicle to the right is lowered and the steering reaction force T to be generated for steering the vehicle to the left is raised.

It is to be noted that the driver drives the vehicle in a right curve by maintaining the steering wheel balance while sensing the steering reaction force T generated by the self-aligning torque. For this reason, if the steering reaction force T is reduced while the vehicle is steered to the right, it becomes difficult to communicate the RPc to the driver through the steering reaction force T. Moreover, the lowered steering reaction force T may disconcert the driver as well.

Accordingly, the steering reaction force T is reduced by a constant degree and, at the same time, the inclination of the steering reaction force characteristics to the steering angle is increased for steering the vehicle to the left. As a result, the driver is made to experience a degree of resistance if he tries to steer the vehicle to the left so that he becomes aware of the RPc present to the left of the subject vehicle. In this example, the steering reaction force T is raised when the vehicle being steered to the left by correcting the RF adjustment quantity ΔTa for steering the vehicle to the left with a correction quantity H corresponding to the steering angle θ.

Figure 15:
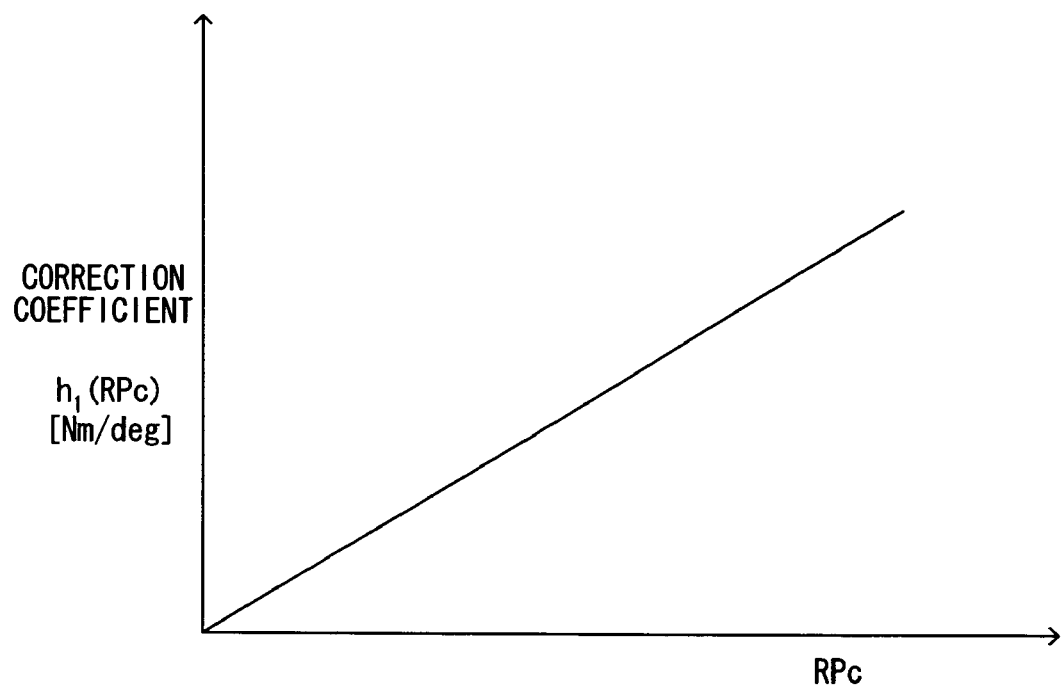
FIG. 15 shows the relationship between the risk potential and the correction coefficient.

The correction quantity H, which is in proportion to the steering angle θ, may be defined in (expression 12) presented below.

$$H = h1(RPc) \times \theta \quad \text{(expression 12)}$$

h1 (RPc) in the expression above represents a function of the RPc and is a coefficient used to determine the correction quantity H. FIG. 15 presents an example of the relationship between the correction coefficient h1 (RPc) and the RPc. The correction coefficient h1 (RPc), which is in proportion to the RPc as shown in FIG. 15, may be defined in (expression 13) presented below by using a constant n1, for instance.

$$h1(RPc) = n1 \times RPc \quad \text{(expression 13)}$$

Accordingly, the RF adjustment quantity ΔTa for steering the vehicle to the left in scene 2 is defined in (expression 14) presented below. It is to be noted that the RF adjustment quantity ΔTa is calculated by using the absolute value of the correction quantity H.

$$\Delta Ta = -(g1(RPc) + |H|)$$
$$= -(g1(RPc) + |h1(RPc) \times \theta|)$$
$$= -m \times RPc - |(n1 \times RPc) \times \theta| \quad \text{(expression 14)}$$

In scene 2, the reaction force T generated for steering the vehicle to the right is lowered and the reaction force T generated for steering the vehicle to the left is raised by incorporating a constant RF adjustment quantity ΔTa=−m×RPc into the SAT characteristics as shown in FIG. 14C (ΔTa<0). In addition, the correction quantity H is incorporated for steering the vehicle to the left to correct the inclination of the SAT characteristics to further raise the reaction force T for steering the vehicle to the left.

(Scene 3)

Figure 16A:
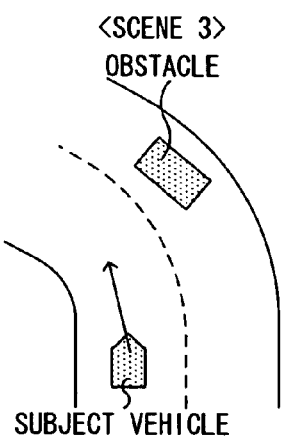
FIGS. 16A–16C illustrate the steering reaction force control implemented in scene 3.
Figure 16B:
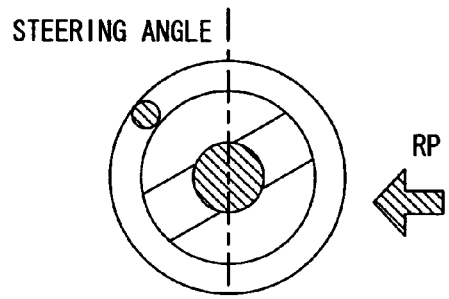
Figure 16C:
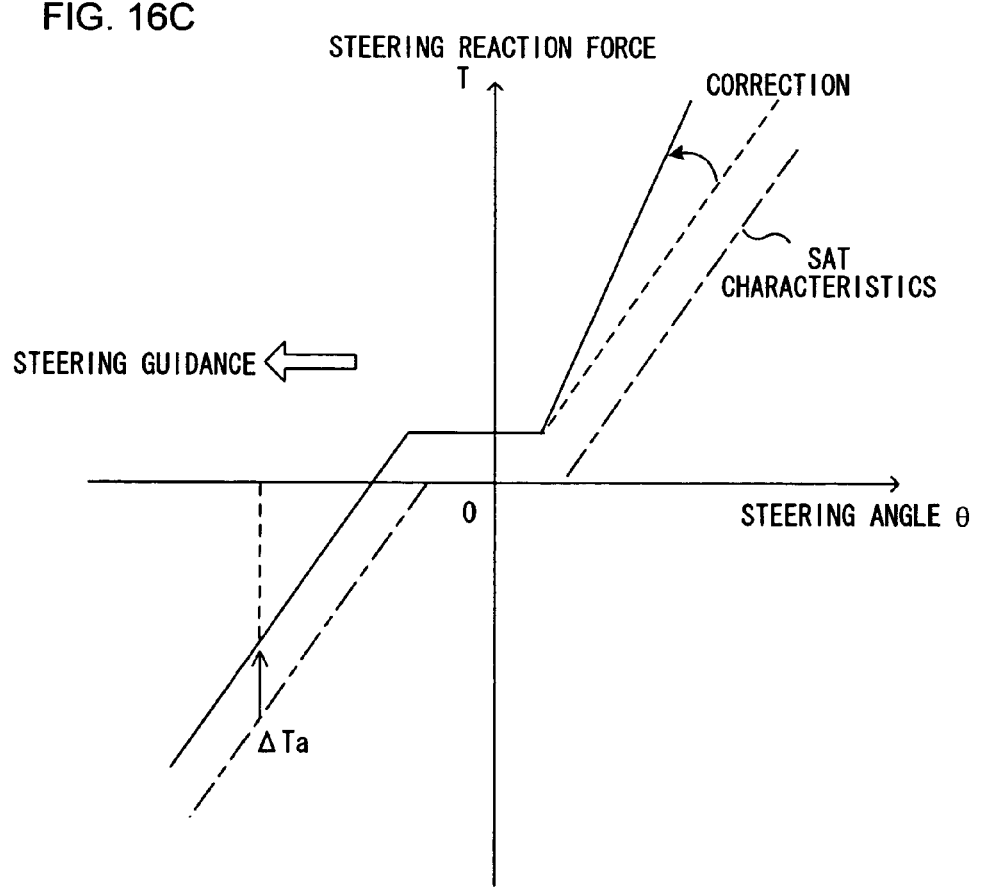

FIG. 16A shows a specific example of traveling conditions corresponding to scene 3. FIG. 16B shows the steering direction and the direction from which the RPc originates in scene 3 and FIG. 16C shows the steering reaction force characteristics to the steering angle. As shown in FIG. 16A, an obstacle such as an oncoming vehicle is present to the front right of the subject vehicle while the subject vehicle is traveling in a left curve. This means that the direction in which the road curves and the direction in which the RPc is present do not match in scene 3.

The RP calculation unit 40A calculates the RPc present to the right of the subject vehicle traveling in the left curve by using (expression 10) as in scenes 1 and 2 explained earlier. The RF unit 40B calculates the RF adjustment quantity ΔTa as (+m×RPc), ΔTa≧0, corresponding to the RPc by using (expression 11).

Since the RPc originates from the right of the subject vehicle, the RF unit 40B incorporates the constant RF adjustment quantity ΔTa (ΔTa≧0) into the SAT characteristics to set the steering reaction force characteristics to the steering angle for scene 3. However, as the RF adjustment quantity ΔTa is incorporated into the SAT characteristics, the steering reaction force T for steering the vehicle to the left becomes small and thus, the RPc cannot be communicated to the driver effectively. Accordingly, the RF adjustment quantity ΔTa for steering the vehicle to the right is corrected by an incorporating the correction quantity H calculated by using (expression 12) into the RF adjustment quantity ΔTa as in scene 2 explained earlier. It is to be noted that the RF the adjustment quantity ΔTa for steering the vehicle to the left is not corrected and is left as it is.

The RF adjustment quantity ΔTa for steering the vehicle to the right in scene 3 can be calculated by using (expression 15) presented below.

$$\Delta Ta = +g1(RPc) + |H| \quad \text{(expression 15)}$$
$$= +g1(RPc) + |h1(RPc) \times \theta|$$
$$= +m \times RPC + |n1 \times RPc \times \theta|$$

In scene 3, the reaction force T generated for steering the vehicle to the right is raised and the reaction force T generated for steering the vehicle to the left is lowered by incorporating a constant RF adjustment quantity ΔTa=+m×RPc into the SAT characteristics as shown in FIG. 16C (ΔTa≧0). In addition, the correction quantity H is added into the RF adjustment quantity ΔTa for steering the vehicle to the right to correct the inclination of the SAT characteristics to further raise the reaction force T for steering the vehicle to the right.

(Scene 4)

Figure 17A:
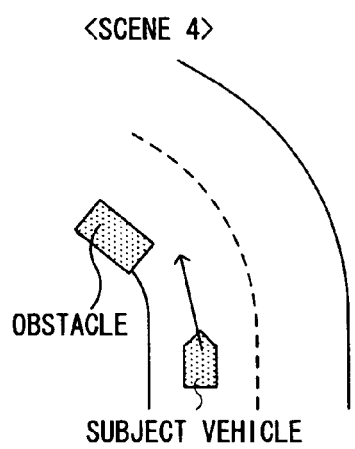
FIGS. 17A–17C illustrate the steering reaction force control implemented in scene 4.
Figure 17B:
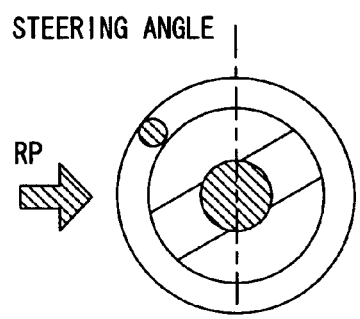
Figure 17C:
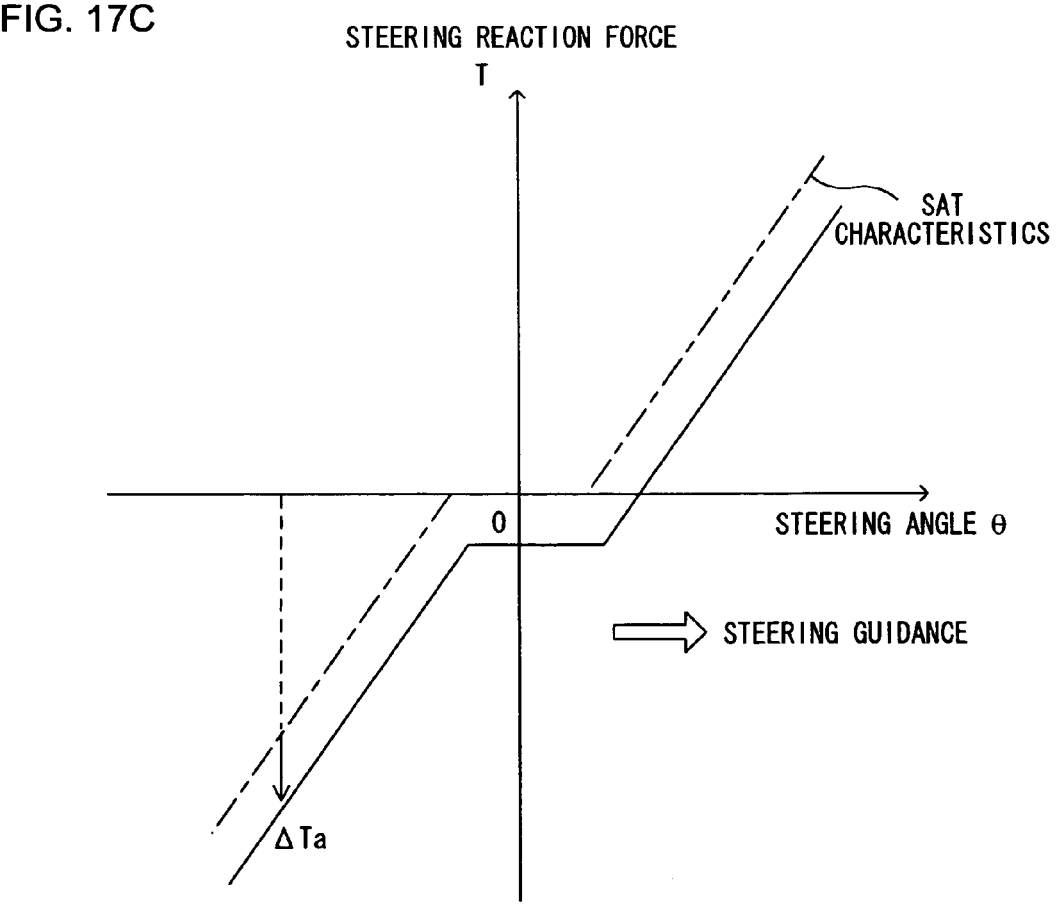

FIG. 17A shows a specific example of traveling conditions corresponding to scene 4. FIG. 17B shows the steering direction and the direction from which the RPc originates in scene 4 and FIG. 17C shows the steering reaction force characteristics to the steering angle. As shown in FIG. 17A, an obstacle such as a parked vehicle is present to the front left of the subject vehicle while the subject vehicle is traveling in a left curve. This means that the direction in which the road curves and the direction in which the RPc is present match in scene 4.

The RP calculation unit 40A calculates the RPc present to the left of the subject vehicle traveling in the left curve by using (expression 10) as in scenes 1~3 explained earlier. The RF unit 40B calculates the RF adjustment quantity ΔTa as (−m×RPc), ΔTa<0, corresponding to the RPc by using (expression 11).

In scene 4, the reaction force T generated for steering the vehicle to the right is lowered and the reaction force T generated for steering the vehicle to the left is raised by incorporating the constant RF adjustment quantity ΔTa=−m×RPc into the SAT characteristics as shown in FIG. 17C.

Figure 18:
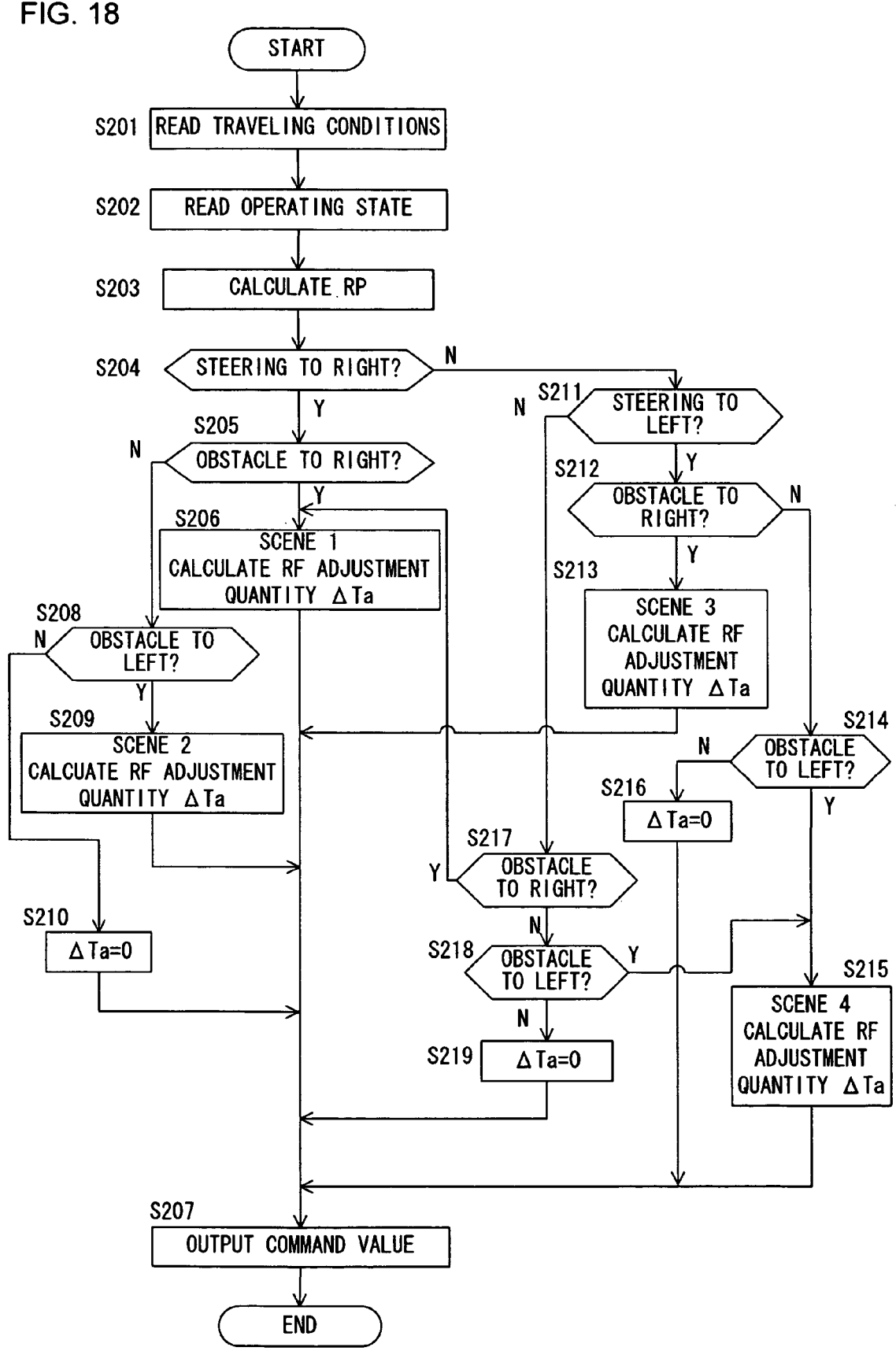
FIG. 18 presents a flowchart of the steering reaction force control processing executed in the second embodiment.

Next, the procedures of the steering reaction force control implemented in the various scenes described above are explained in reference to FIG. 18. FIG. 18 presents a flowchart of the processing executed to calculate the RPc and the processing executed to implement the steering reaction force control. These processing procedures are executed continuously by the controller 40 at predetermined time intervals of, e.g., 50 msec.

In step S201, the traveling conditions such as the vehicle speed Vf and the obstacle conditions detected by the vehicle speed sensor 20 and the front camera 50 are read. The obstacle conditions include the relative distance D, the relative speed Vr and the relative angle θr to an obstacle present around the subject vehicle. In step S202, the steering angle θ detected by the steering angle sensor 92 is read as operating conditions of the subject vehicle. In step S203, the RPc present along the lateral direction relative to the subject vehicle is calculated by using (expression 10).

In step S204, a decision is made as to whether or not the subject vehicle is being steered to the right, i.e., whether or not the vehicle is traveling in a right curve, based upon the image signal from the front camera 50 read in step S201 and the steering angle θ read in step S202. If an affirmative decision is made in step S204, the operation proceeds to step S205. In step S205, a decision is made as to whether or not there is an obstacle, e.g., an oncoming vehicle, present to the right of the subject vehicle based upon the obstacle conditions read in step S201. If an affirmative decision is made in step S205, the operation proceeds to step S206.

In step S206, the RF adjustment quantity ΔTa is calculated by using (expression 11) based upon the RPc in order to implement the steering reaction force control for scene 1 (ΔTa≧0).

If a negative decision is made in step S205, the operation proceeds to step S208 to make a decision as to whether or not there is an obstacle, e.g., a parked vehicle, present to the left of the subject vehicle. If an affirmative decision is made in step S208, the operation proceeds to step S209.

In step S209, the RF adjustment quantity ΔTa is calculated based upon the RPc in order to implement the steering reaction force control for scene 2. As explained earlier, the RF adjustment quantity is calculated as ΔTa=−m×RPc by using (expression 11) for steering the vehicle to the right (θ≧0). For steering the vehicle to the left (θ<0), the RF adjustment quantity ΔTa is calculated as ΔTa=−(m×RPc+|H|) by using (expression 14). The RF adjustment quantity ΔTa assumes a negative value for steering the vehicle to the right and to the left.

If a negative decision is made in step S208, i.e. if no obstacle is present either to the right or to the left of the subject vehicle, the operation proceeds to step S210 to set 0 for the RF adjustment quantity ΔTa.

If a negative decision is made in step S204, the operation proceeds to step S211 to make a decision as to whether or not the subject vehicle is being steered to the left, i.e., whether or not the subject vehicle is traveling in a left curve. If an affirmative decision is made in step S211, the operation proceeds to step S212 to make a decision as to whether or not there is an obstacle present to the right of the subject vehicle. If an affirmative decision is made in step S212, the operation proceeds to step S213.

In step S213, the RF adjustment quantity ΔTa is calculated based upon the RPc in order to implement the steering reaction force control for scene 3. As explained earlier, the RF adjustment quantity ΔTa is calculated as ΔTa=+(m×RPc+|H|), ΔTa≧0, by using (expression 15) for steering the vehicle to the right (θ≧0). For steering the vehicle to the left (θ<0), the RF adjustment quantity ΔTa is calculated as ΔTa=+m×RPc(ΔTa≧0) by using (expression 11).

If a negative decision is made in step S212, the operation proceeds to step S214 to make a decision as to whether or not there is an obstacle present to the left of the subject vehicle. If an affirmative decision is made in step S214, the operation proceeds to step S215. In step S215, the RF adjustment quantity ΔTa is calculated as ΔTa=−m×RPc by using (expression 11) (ΔTa<0) based upon the RPc in order to implement the steering reaction force control for scene 4.

If an negative decision is made in step S214, i.e. if no obstacle is present either to the left or to the right of the subject vehicle, the operation proceeds to step S216 to set 0 for the RF adjustment quantity ΔTa.

If a negative decision is made in step S211, which indicates that the subject vehicle is currently traveling straight ahead, the operation proceeds to step S217. In step S217, a decision is made as to whether or not there is an obstacle present to the right of the subject vehicle. If an affirmative decision is made in step S217, the operation proceeds to step S206 to calculate the RF adjustment quantity as ΔTa=+m×RPc corresponding to the Pc (ΔTa≧0). If a negative decision is made in step S217, the operation proceeds to step S218 to make a decision as to whether or not an obstacle is present to the left of the subject vehicle. If an affirmative decision is made in step S218, the operation proceeds to step S215 to calculate the RF adjustment quantity as ΔTa=−m×RPc corresponding to the RPc (ΔTa<0). If a negative decision is made in step S218, the operation proceeds to step S219 to set 0 for the RF adjustment quantity ΔTa.

In step S207, a command is issued for the SF control unit 40C to adjust the steering reaction force characteristics to the steering angle by incorporating the RF adjustment quantity ΔTa calculated in correspondence to the specific scene into the SAT characteristics. In response to the command, the SF control unit 40C controls the servomotor 91 and thus controls the steering reaction force T generated at the steering wheel 90.

The second embodiment described above achieves the following advantages.

(1) The direction along which the subject vehicle lane curves and the direction from which the RPc originates are detected as external influences and the reaction force characteristics of the steering device are corrected in correspondence to the curving direction and the direction of the RPc. As a result, the RPc present along the lateral direction can be communicated accurately through the steering reaction force T in a manner suited to the driver's perception to assist the drive to operate the vehicle.

(2) The RF adjustment quantity ΔTa for the steering wheel is calculated based upon the RPc. The RF adjustment quantity ΔTa is then corrected if the curving direction and the direction of the RPc do not match, while the calculated RF adjustment quantity ΔTa corresponding to the RPc is left as it is if the curving direction and the direction of the RPc match. Thus, the RPc can be communicated to the driver accurately and, at the same time, the driver is prompted to drive the vehicle in the desirable direction.

(3) If the curving direction and the direction of the RPc match as in scenes 1 and 4, the RF adjustment quantity ΔTa is incorporated into the steering reaction force T both along the steering direction matching the curving direction and the steering direction opposite from the curving direction. If the curving direction and the direction of the RPc do not match, as in scenes 2 and 3, the RF adjustment quantity ΔTa is incorporated into the steering reaction force T along the steering direction matching the curving direction and the corrected RF adjustment quantity ΔTa is incorporated along the opposite direction. Thus, the RPc can be communicated to the driver accurately and, at the same time, the driver is prompted to drive the vehicle in the desirable direction.

(4) Since the RF adjustment quantity ΔTa is corrected based upon the RPc and the steering angle θ, the driver is prompted to steer the vehicle along the desirable direction.

Third Embodiment

Next, the driving assist system achieved in the third embodiment of the present invention is explained in reference to the drawings. The structure of the driving assist system achieved in the third embodiment is similar to that of the driving assist system in the second embodiment shown in FIGS. 8 and 9. The following explanation focuses on the differences from the second embodiment.

Figure 19A:
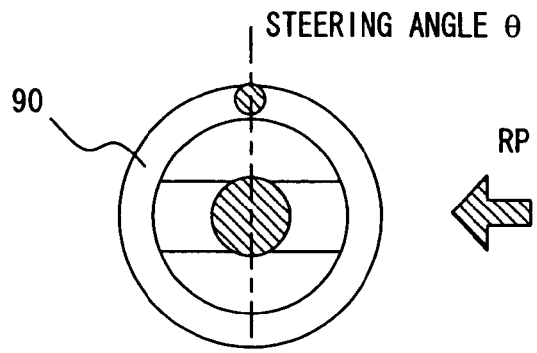
FIGS. 19A and 19B illustrate the basic principle of the steering reaction force control executed in a third embodiment.
Figure 19B:
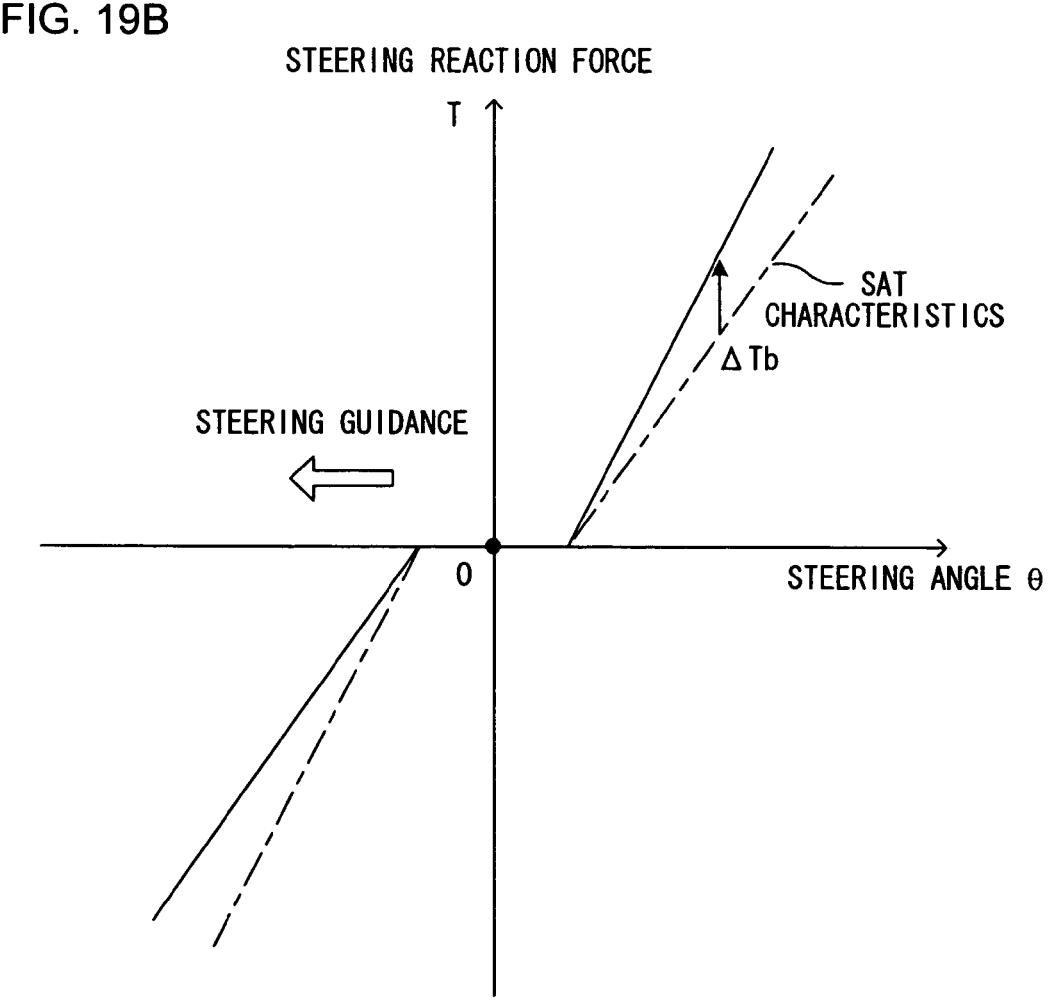
Figure 20A:
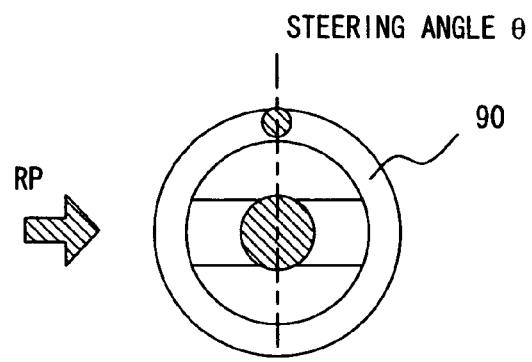
FIGS. 20A and 20B illustrate the basic principle of the steering reaction force control executed in the third embodiment.
Figure 20B:
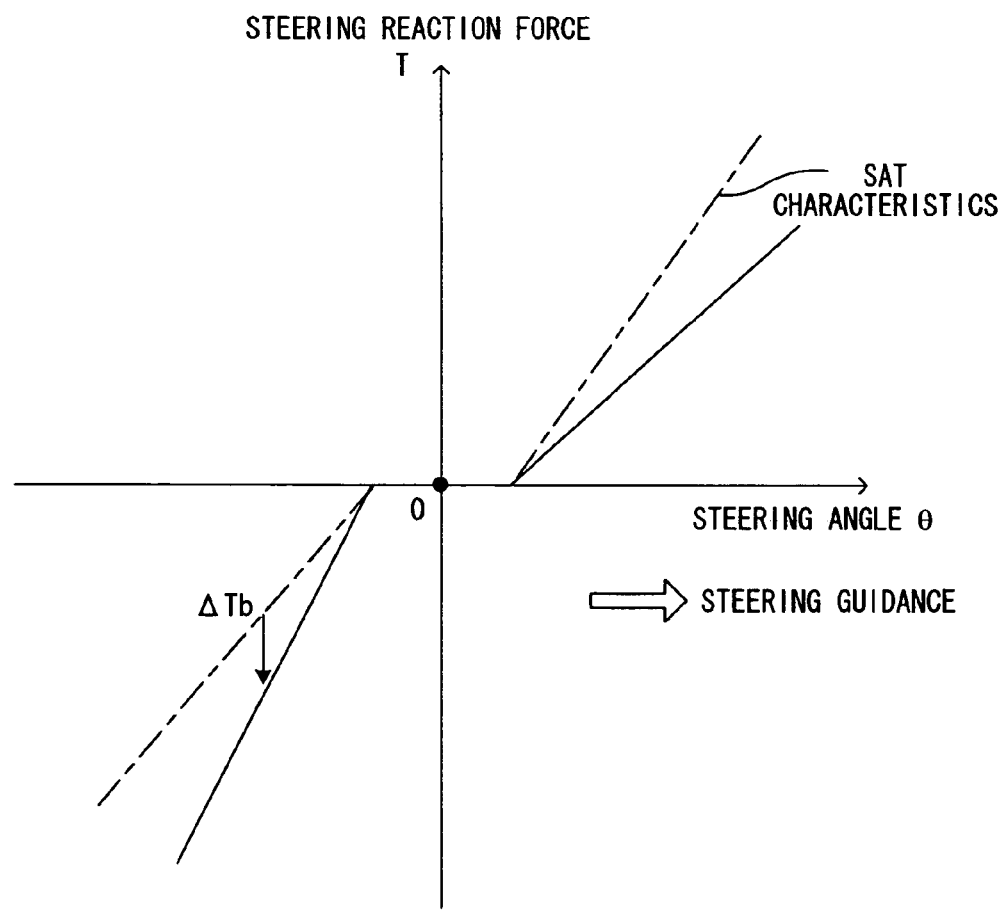

FIGS. 19A and 19B and FIGS. 20A and 20B illustrate the basic principle of the steering reaction force control executed in the third embodiment. FIGS. 19A and 20A each indicate the steering direction and a direction from which the RPc originates. In FIGS. 19B and 20B, the steering angle θ on the right side and the steering reaction force T generated for steering the vehicle to the right assume positive values, whereas the steering angle θ on the left side and the steering reaction force T generated for steering the vehicle to the left assume negative values. In the third embodiment, steering reaction force control is achieved by adjusting the inclination of the SAT characteristics in conformance to the particulars of the RPc.

As shown in FIGS. 19A and 19B, the RPc originating from the right of the subject vehicle is communicated to the driver by increasing the inclination of the SAT characteristics for steering the vehicle to the right as indicated by a solid line. In addition, the inclination of the SAT characteristics is reduced for steering the vehicle to the left as indicated by the solid line so as to prompt the driver to drive the vehicle along the desirable direction.

As shown in FIGS. 20A and 20B, the RPc originating from the left of the subject vehicle is communicated to the driver by increasing the inclination of the SAT characteristics for steering the vehicle to the left as indicated by a solid line. In addition, the inclination of the SAT characteristics is reduced for steering the vehicle to the right so as to guide the driver to drive the vehicle along the desirable direction.

In the third embodiment, various traveling conditions are classified into scenes 1~4 as in the second embodiment explained earlier so as to communicate the RPc to the driver accurately even while the subject vehicle is traveling on a winding road. The inclination of the steering reaction force characteristics to the steering angle is corrected differently for each scene.

(Scene 1)

Figure 21A:
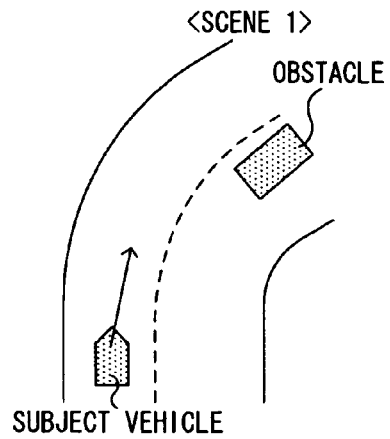
FIGS. 21A–21C illustrate the steering reaction force control implemented in scene 1.
Figure 21B:
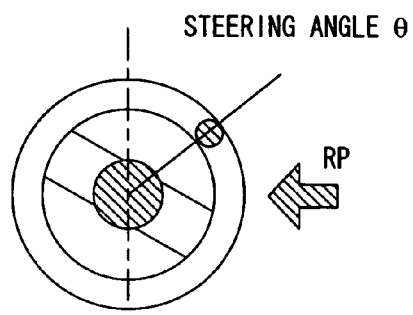
Figure 21C:
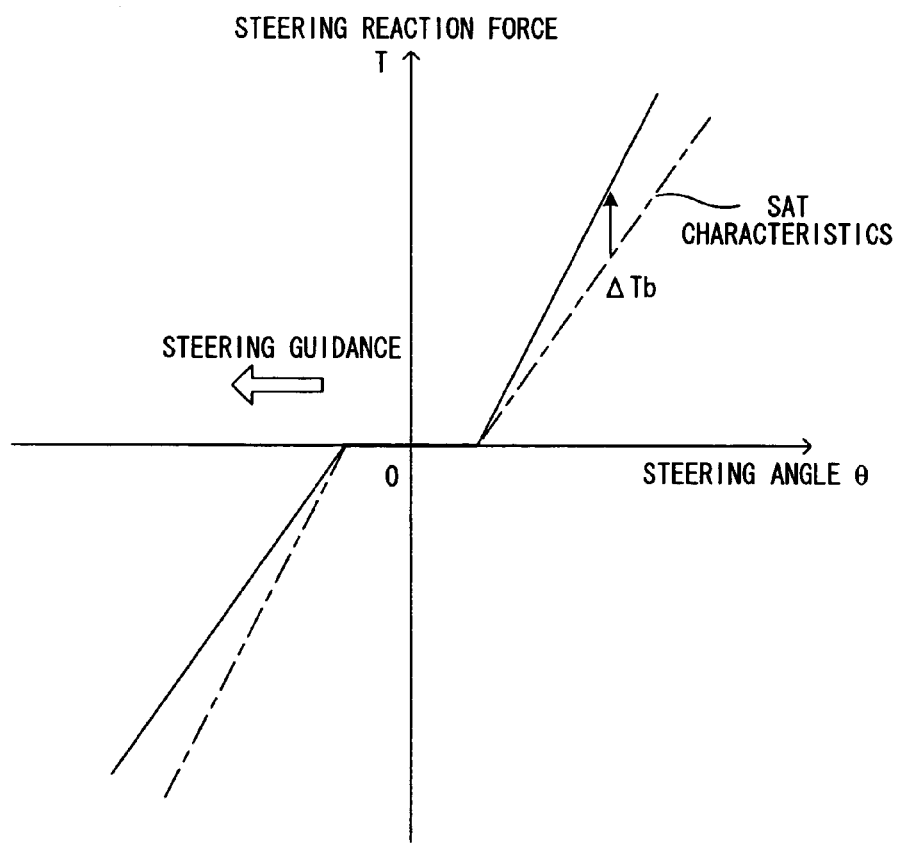
Figure 22:
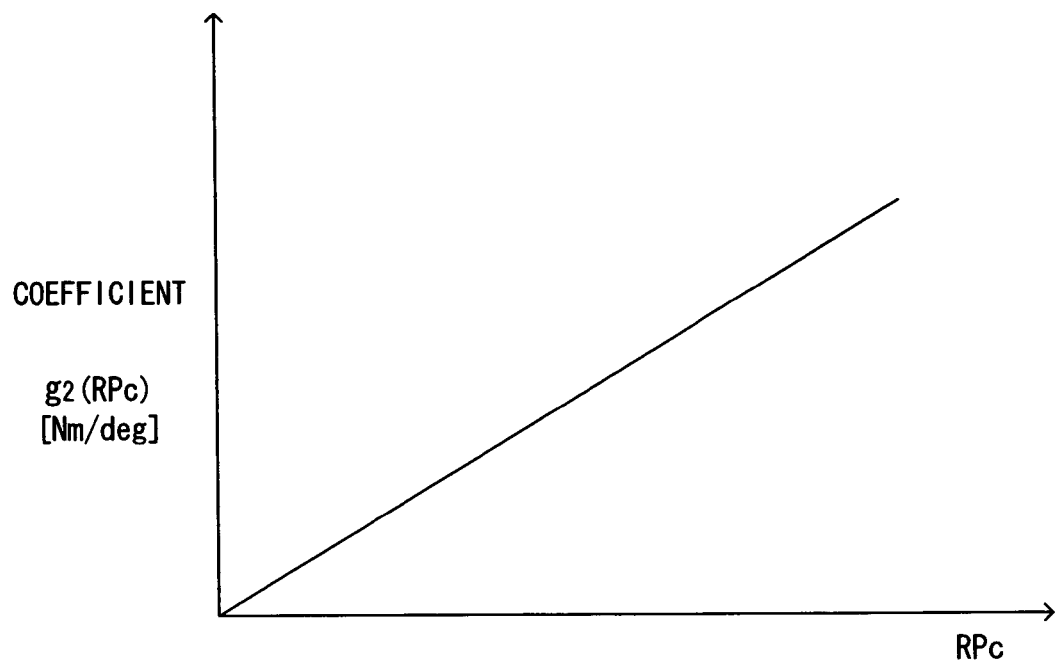
FIG. 22 shows the relationship between the risk potential and the reaction force coefficient.

FIGS. 21A~21C respectively illustrate the traveling conditions corresponding to scene 1, the steering direction and the direction from which the RPc originates, and the steering reaction force characteristics to the steering angle.

The RP calculation unit 40A calculates the RPc present to the right of the subject vehicle traveling in a right curve by using (expression 10). The RF unit 40B calculates a RF adjustment quantity ΔTb (ΔTb≧0) by using (expression 16) presented below based upon the RPc and the steering angle θ.

$$\Delta Tb = +g2(RPc) \times |\theta| \quad \text{(expression 16)}$$
$$= +q \times RPc \times |\theta|$$

The coefficient g2 (RPc) used to determine the RF adjustment quantity ΔTb in the expression above is a function of the RPc. The function g2 (RPc), which may be expressed as g2 (RPc)=q×RPc by using a predetermined constant q, assumes a larger value as the RPc increases.

In scene 1, the RF adjustment quantity ΔTb (ΔTb≧0) corresponding to the RPc and the steering angle θ is incorporated into the SAT characteristics, as shown by a solid line in FIG. 21C. Thus, the reaction force T generated for steering the subject vehicle to the right is increased and the reaction force T generated for steering the subject vehicle to the left is reduced by adjusting the inclination of the SAT characteristics.

(Scene 2)

Figure 23A:
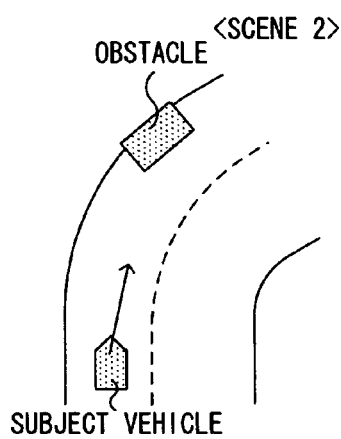
FIGS. 23A–23C illustrate the steering reaction force control implemented in scene 2.
Figure 23B:
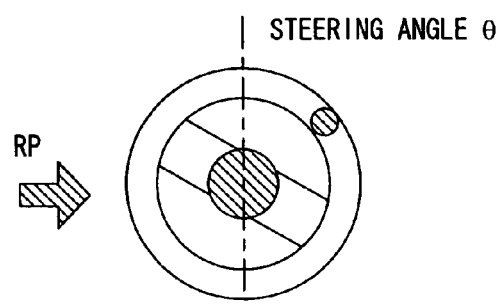
Figure 23C:
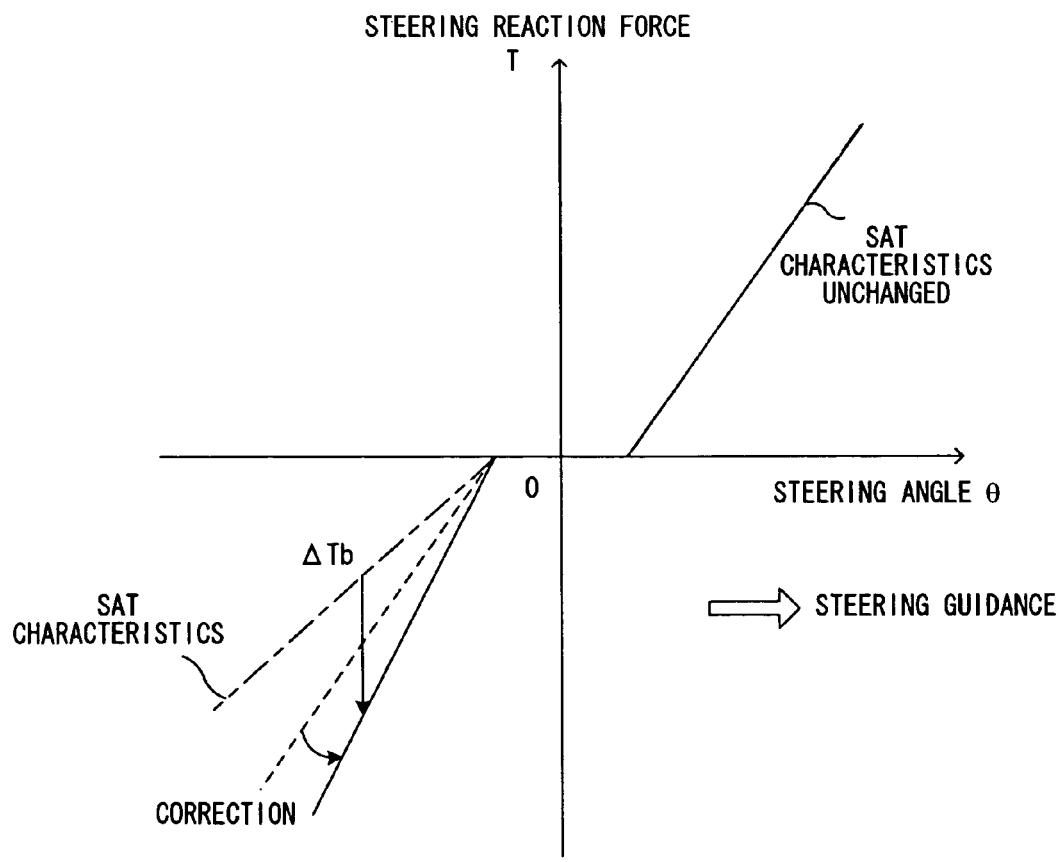

FIGS. 23A~23C respectively illustrate the traveling conditions corresponding to scene 2, the steering direction and the direction from which the RPc originates, and the steering reaction force characteristics to the steering angle. The RPc present to the left of the subject vehicle traveling in a right curve is calculated by using (expression 10) explained earlier.

In scene 2, the SAT characteristics are not altered for steering the vehicle to the right. If, on the other hand, the subject vehicle is being steered to the left, the RF adjustment quantity $\Delta Tb$ ($\Delta Tb<0$) is calculated as will be described below corresponding to the RPc and the steering angle $\theta$ and is incorporated into the SAT characteristics so as to effectively communicate the RPc to the driver. The RF adjustment quantity $\Delta Tb$ calculated in scene 2 contains a correction quantity H1 used to correct the inclination of the SAT characteristics.

The correction quantity H 1, which is in proportion to the steering angle $\theta$, can be calculated by using (expression 17) presented below.

$$H1 = h2(RPc) \times \theta$$
$$= n2 \times RPc \times \theta$$
(expression 17)

Figure 24:
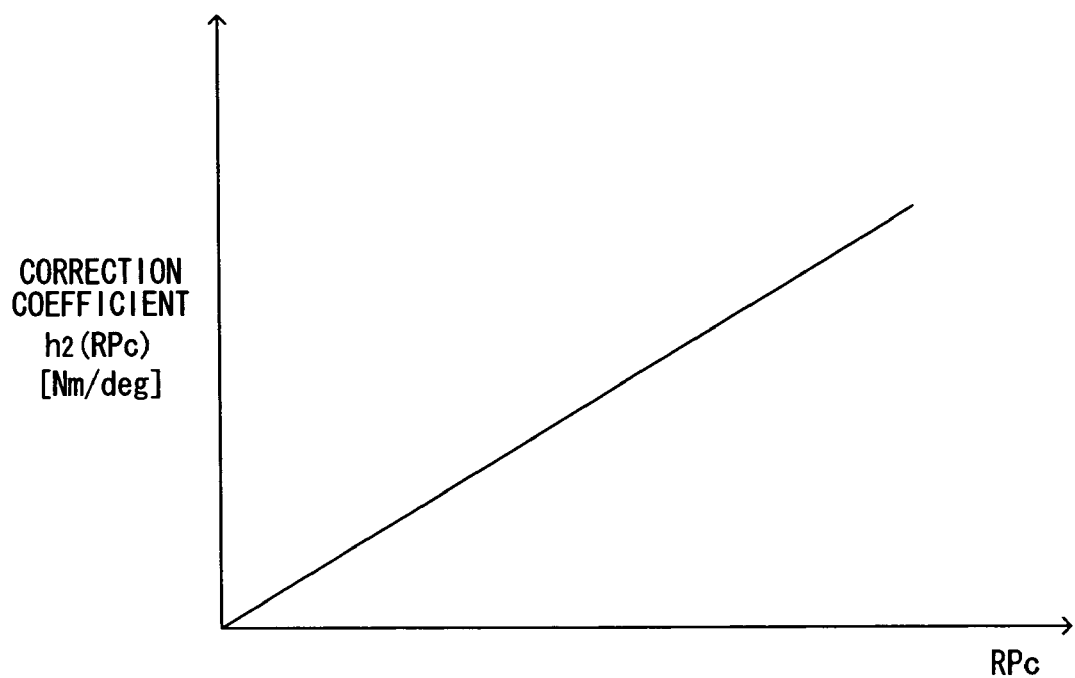
FIG. 24 shows the relationship between the risk potential and the correction coefficient.

The coefficient h2 (RPc) used in the expression above to determine the correction quantity H1 is a function of the RPc. The coefficient h2(RPc) assumes a greater value as the RPc increases as shown in FIG. 24, for instance, h2(RPc)=n2× RPc. The constant n2 is set to an appropriate value in advance.

Accordingly, the RF adjustment quantity $\Delta Tb$ for steering the subject vehicle to the left in scene 2 can be defined in (expression 18) presented below. It is to be noted that the RF adjustment valued $\Delta Tb$ is calculated by using the absolute value of the correction quantity H 1.

$$\Delta Tb = -(g2(RPc) \times |\theta| + |H1|)$$
$$= -(g2(RPc) \times |\theta| + |h2(RPc) \times |\theta|)$$
$$= -q \times RPc \times |\theta| - |n2 \times RPc \times \theta|$$
(expression 18)

In scene 2, the inclination of the SAT characteristics is not altered for steering the subject vehicle to the right, whereas it is adjusted for steering the subject vehicle to the left. For steering the subject vehicle to the left, the RF adjustment quantity $\Delta Tb$ is calculated according to the RPc and the steering angle $\theta$ and is incorporated into the SAT characteristics to raise the steering reaction force T by adjusting the inclination of the SAT characteristics, as shown by a solid line in FIG. 23C.

(Scene 3)

Figure 25A:
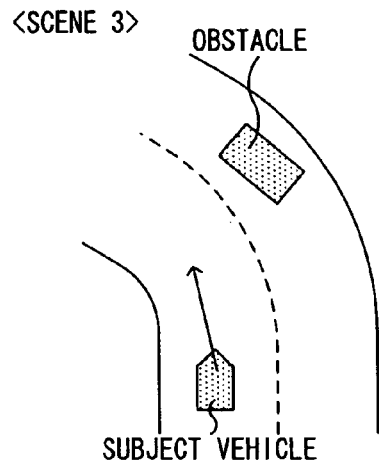
FIGS. 25A–25C illustrate the steering reaction force control implemented in scene 3.
Figure 25B:
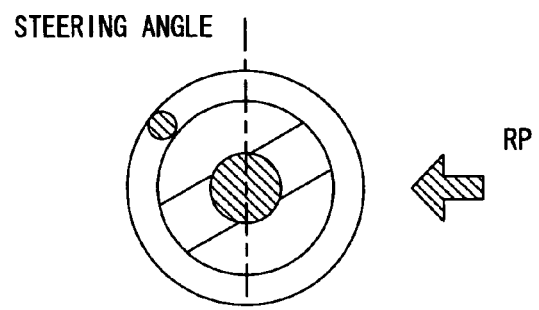
Figure 25C:
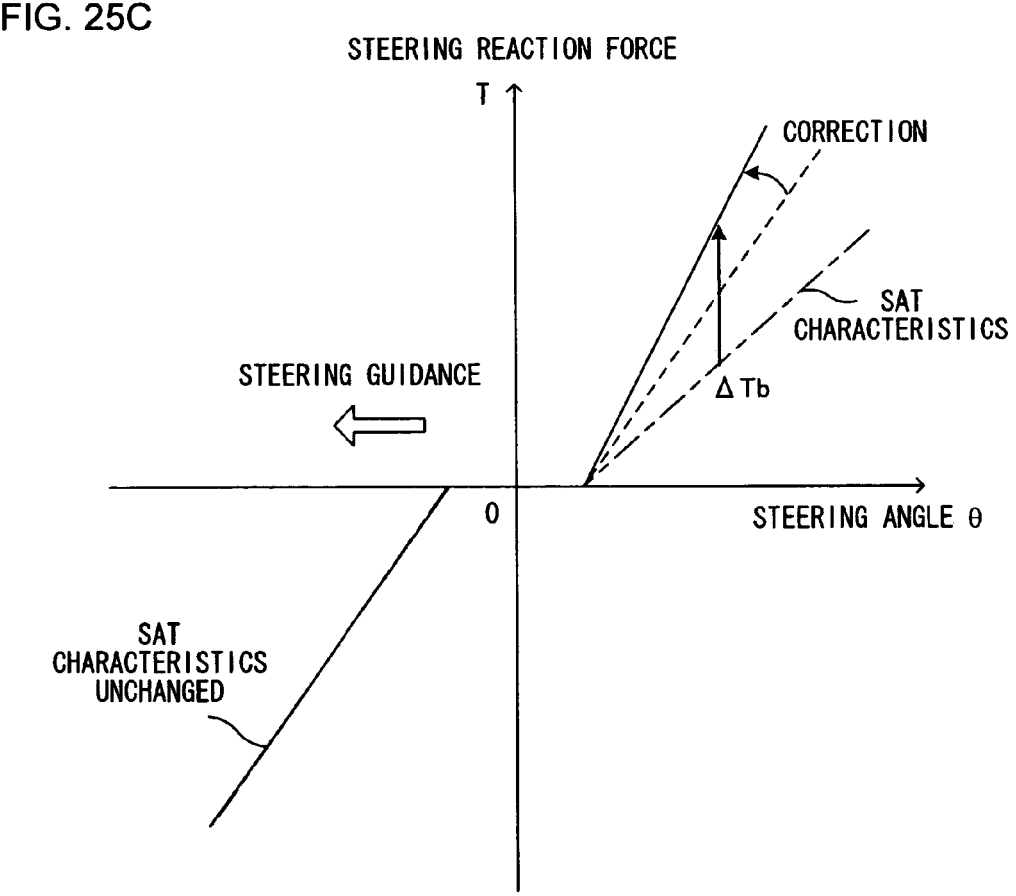

FIGS. 25A~25C respectively illustrate the traveling conditions corresponding to scene 3, the steering direction and the direction from which the RPc originates, and the steering reaction force characteristics to the steering angle. The RPc present to the right of the subject vehicle traveling in a left curve is calculated by using (expression 10) explained earlier.

In scene 3, the SAT characteristics are not altered for steering the subject vehicle to the left. If, on the other hand, the subject vehicle is being steered to the right, the RF adjustment quantity $\Delta Tb$ is calculated as will be described below corresponding to the RPc and the steering angle $\theta$ ($\Delta Tb\geqq0$) and is incorporated into the SAT characteristics so as to effectively communicate the RPc to the driver. The RF adjustment quantity $\Delta Tb$ calculated in scene 3 contains correction quantity H1 used to correct the inclination of the SAT characteristics. The correction quantity H1 may be calculated by using (expression 17).

The RF adjustment quantity $\Delta Tb$ for steering the vehicle to the right can be defined in (expression 19) presented below. It is to be noted that the constants q and n2 are the same as the constants q and n2 used in (expression 18).

$$\Delta Tb = +g2(RPc) \times |\theta| + |H1|$$
$$= +g2(RPc) \times |\theta| + |h2(RPc) \times \theta|$$
$$= +q \times RPc \times |\theta| + |n2 \times RPc \times \theta|$$
(expression 19)

In scene 3, the inclination of the SAT characteristics is not altered for steering the subject vehicle to the left, whereas it is adjusted for steering the vehicle to the right. For steering the subject vehicle to the right, the RF adjustment quantity $\Delta Tb$ is calculated ($\Delta Tb\geqq0$) according to the RPc and the steering angle $\theta$ and is incorporated into the SAT characteristics to raise the steering reaction force T.

(Scene 4)

FIGS. 26A~26C respectively illustrate the traveling conditions corresponding to scene 4, the steering direction and the direction from which the RPc originates, and the steering reaction force characteristics to the steering angle. The RPc present to the left of the subject vehicle traveling in a left curve is calculated by using (expression 10) explained earlier. In addition, the RF adjustment quantity $\Delta Tb$ is calculated as $\Delta Tb=-q\times RPc\times|\theta|$ by using (expression 16) ($\Delta Tb<0$).

In scene 4, the inclination of the SAT characteristics is adjusted by incorporating the reaction force adjustment quantity $\Delta Tb$ ($\Delta Tb<0$) into the SAT characteristics to reduce the reaction force T generated for steering the vehicle to the right and also to raise the reaction force T generated for steering the vehicle to the left.

Next, the procedures of the steering reaction force control implemented in the various scenes described above are explained in reference to FIG. 27. FIG. 27 presents a flowchart of the processing executed to calculate the RPc and the processing executed to implement the steering reaction force control. These processing procedures are executed continuously by the controller 40 at a predetermined time intervals of, e.g., 50 msec.

The processing executed in steps S 301~S 305 is identical to that executed in steps S 201~S 205 in the flowchart presented in FIG. 18 and explanations of which are omitted herein. If an affirmative decision is made in step S305, i.e., if it is determined that the subject vehicle is being steered to the right and there is an obstacle present to the right of the subject vehicle, the operation proceeds to step S306.

In step S306, the inclination of the SAT characteristics is altered in correspondence to the RPc in order to execute the steering reaction force control for scene 1. In this example, the RF adjustment quantity $\Delta Tb$ is calculated as $\Delta Tb=+q\times RPc\times|\theta|$ by using (expression 16) ($\Delta T\geqq0$).

If a negative decision is made in step S305, the operation proceeds to step S308 to make a decision as to whether or not there is an obstacle to the left of the subject vehicle. If an affirmative decision is made in step S308, the operation proceeds to step S309 to execute the steering reaction force control for scene 2. In step S309, the inclination of the SAT characteristics is altered in correspondence to the RPc. In this example, for steering the subject vehicle to the right ($\theta\geqq0$) the RF adjustment quantity $\Delta Tb$ is set to 0. For steering the subject vehicle to the left ($\theta$<0), on the other hand, the RF adjustment quantity $\Delta Tb$ is calculated as $\Delta Tb=-q\times RPc\times|\theta|-|H1|$ by using (expression 18) based upon the RPc and the steering angle $\theta$ ($\Delta Tb$<0). If a negative decision is made in step S308, the operation proceeds to step S310 in which the RF adjustment quantity $\Delta Tb$ is set to 0.

If a negative decision is made in step S304, the operation proceeds to step S311 to make a decision as to whether or not the subject vehicle is being steered to the left. If an affirmative decision is made in step S311, the operation proceeds to step S312 to make a decision as to whether or not there is an obstacle present to the right of the subject vehicle. If an affirmative decision is made in step S312, the operation proceeds to step S313 to execute the steering reaction force control for scene 3.

In step S313, the inclination of the SAT characteristics is altered in correspondence to the RPc. In this example, for steering the vehicle to the right ($\theta\geq0$) the RF adjustment quantity $\Delta Tb$ is calculated as $\Delta Tb=+q\times RPc\times|\theta|+|H1|$ by using (expression 19) based upon the RPc and the steering angle $\theta$ ($\Delta Tb\geq0$). For steering the vehicle to the left ($\theta$<0), on the other hand, the RF adjustment quantity $\Delta Tb$ is set to 0. If a negative decision is made in step S312, the operation proceeds to step S314.

In step S314, a decision is made as to whether or not there is an obstacle to the left of the subject vehicle. If an affirmative decision is made in step S314, the operation proceeds to step S315 to execute the steering reaction force control for scene 4. In step S315, the inclination of the SAT characteristics is altered in correspondence to the RPc. In this example, the RF adjustment quantity $\Delta Tb$ is calculated as $\Delta Tb=-q\times RPc\times|\theta|$ by using (expression 16) based upon the RPc and the steering angle $\theta$ ($\Delta Tb$<0). If a negative decision is made in step S314, the operation proceeds to step S316 in which the RF adjustment quantity $\Delta Tb$ is set to 0.

If a negative decision is made in step S311, it is determined that the subject vehicle is traveling straight ahead, and the operation proceeds to step S317. In step S317, a decision is made as to whether or not there is an obstacle present to the right of the subject vehicle. If an affirmative decision is made in step S317, the operation proceeds to step S306. In step S306, the RF adjustment quantity $\Delta Tb$ is calculated as $\Delta Tb=+q\times RPc\times|\theta|$ in correspondence to the RPc and the steering angle $\theta$ by using (expression 16) ($\Delta Tb\geq0$).

If a negative decision is made in step S317, the operation proceeds to step S318 to make a decision as to whether or not there is an obstacle present to the left of the subject vehicle. If an affirmative decision is made in step S318, the operation proceeds to step S315. In step S315, the RF adjustment quantity $\Delta Tb$ is calculated as $\Delta Tb=-q\times RPc\times|\theta|$ in correspondence to the RPc and the steering angle $\theta$ by using (expression 16) ($\Delta Tb$<0). If a negative decision is made in step S318, on the other hand, the operation proceeds to step S319 in which the RF adjustment quantity $\Delta Tb$ is set to 0.

In step S307, a command is issued for the SF control unit 40C to adjust the inclination of the SAT characteristics by incorporating the RF adjustment quantity $\Delta Tb$ calculated in correspondence to the specific scene into the SAT characteristics. In response to the command, the SF control unit 40C controls the servomotor 91 and thus controls the steering reaction force T generated at the steering wheel 90 through adjustment of the inclination of the SAT characteristics.

The following advantages are achieved in the third embodiment described above.

When the curving direction and the direction along which the RPc is present match, as in scenes 1 and 4, the RF adjustment quantity $\Delta Tb$ is incorporated along the steering direction both matching and opposite from the curving direction to adjust the inclination of the steering reaction force characteristics. When the curving direction and the direction along which the RPc is present do not match, as in scenes 2 and 3, on the other hand, the inclination of the steering reaction force characteristics along the steering direction matching the curving direction is not altered but the inclination of the steering reaction force characteristics along the opposite direction is altered by incorporating the corrected RF adjustment quantity $\Delta Tb$. Thus, the RPc can be communicated accurately in a manner reflecting the state of the driver's perception and, at the same time, the driver is prompted to steer the vehicle along the desirable direction. In addition, the driver is allowed to drive the vehicle smoothly along the curve while sensing the steering reaction force attributable to the SAT characteristics in scenes 2 and 3.

It is to be noted that in the second embodiment, the RF adjustment quantity $\Delta Ta$ is incorporated along the steering direction matching the curving direction if the curving direction and the direction in which the RPc is present do not match, as in scenes 2 and 3. However, it is also acceptable not to incorporate the RF adjustment quantity $\Delta Ta$ along the steering direction matching the curving direction, as in the third embodiment. In such a case, the driver is allowed to drive the vehicle smoothly while sensing the steering reaction force T attributable to the SAT characteristics as the vehicle travels along the curve.

In the embodiments explained above, the external influence which will affect the operation of the vehicle operating device by the driver is considered as the running resistance RL, or the curving direction and the direction from which the RPc originates. However, the present invention is not limited to these examples. The driver's perception of the reaction force generated at a vehicle operating device may be detected and used as an external influence instead.

The running resistance RL of the subject vehicle was calculated and the state of the depression of the accelerator pedal 70 was estimated in correspondence to the running resistance RL in the first embodiment. Since the level of the running resistance RL is greatly affected by whether the lane in which the vehicle is currently traveling is an uphill lane or a downhill lane, the state of the inclination of the lane may be detected instead of calculating the running resistance RL. In such a case, the state of the lane, i.e. whether it is an uphill lane or a downhill lane, may be detected by a clinometer or an angle meter, or based upon geographic information provided by a navigation system, for instance. In addition, the state of pedal depression may be estimated based upon any change occurring in the operation amount S of the accelerator pedal 70 detected by the pedal position sensor 61.

The RF increase quantity $\Delta F$ was set so as to increase exponentially relative to the RP in the first embodiment. The RF increase quantity $\Delta F$ may instead be set so as to increase linearly as the level of the RP rises. In addition, while the exponent n in (expression 6) is altered when correcting the RF increase quantity $\Delta F$ in correspondence to the state of the depression of the accelerator pedal 70, the RF increase quantity $\Delta F$ may instead be corrected by changing the constant k.

The curving direction of the lane in which the subject vehicle was currently traveling is detected based upon the steering angle $\theta$ in the second and third embodiments. The curving direction may instead be ascertained by using geographic information provided by a navigation system or through road-to-vehicle communication.

While the RF adjustment quantity $\Delta Ta$ is set in proportion to the RPc in the second embodiment, the present invention is not limited to this example. The reaction force adjustment quantity ΔTa may instead be set to increase exponentially relative to the RPc. In addition, while the correction coefficient h1 (RPc) used to calculate the correction quantity H is set in proportion to the RPc, the present invention is not limited to this example. The RF adjustment quantity ΔTa and the correction coefficient h1 (RPc) may be set through any of various methods by ensuring that they both increase as the level of the RPc rises.

While the coefficient g2 (RPc) used to calculate the RF adjustment quantity ΔTb and the correction coefficient h2(RPc) used to calculate the correction quantity H1 are set in proportion to the RPc in the third embodiment, the present invention is not limited to this example. The coefficient g2 (RPc) and the correction coefficient h2 (RPc) may be set through any of various methods by ensuring that they both increase as the level of the RPc rises.

Furthermore, the correction quantities H and H1 are calculated to correct the RF adjustment quantities ΔTa and ΔTb by incorporating the correction quantities H and H1 in the second embodiment and the third embodiment respectively. However, the present invention is not limited to these examples, and a correction may be achieved by multiplying the RF adjustment quantity ΔTa or ΔTb by a predetermined coefficient instead.

It is to be noted that the driving operation by the driver may be assisted through a combination of the accelerator pedal reaction force control achieved in the first embodiment and the steering reaction force control achieved in the second or third embodiment as well. For instance, either the accelerator pedal reaction force control or the steering reaction force control may be selectively executed in correspondence to the specific type of the external influence, or the two types of reaction force control may be executed simultaneously.

The above described embodiments are examples, and various modifications can be made without departing from the spirit and scope of the invention.

The disclosure of the following priority application is herein incorporated by reference:

Japanese Patent Application No. 2002-271144 filed Sep. 18, 2002.

What is claimed is:

1. A driving assist system for a vehicle, comprising:
a traveling condition recognition device configured to detect a state of the vehicle and a traveling environment of the vehicle;
a risk potential calculation device configured to calculate a risk potential present around the vehicle based upon detection results obtained by the traveling condition recognition device;
a reaction force adjustment device configured to adjust reaction force characteristics of a vehicle operating device to convey information related to the calculated risk potential to a driver of the vehicle, based upon the risk potential calculated by the risk potential calculation device, wherein the vehicle operating device is a steering device or an accelerator pedal
an external influence detection device configured to detect an external influence which will affect an operation of the steering device or the accelerator pedal by the driver; and
a reaction force correction device configured to correct the reaction force characteristics of the steering device or the accelerator pedal adjusted by the reaction force adjustment device, based upon detection results obtained by the external influence detection device, wherein:
the reaction force adjustment device adjusts at least one of reaction force characteristics of the accelerator pedal and reaction force characteristics of the steering device as the reaction force characteristics of the steering device or the accelerator pedal.

2. The system of claim 1, wherein the reaction force correction device corrects the reaction force characteristics differently based on different levels of a running resistance estimating a state of a pedal operation by the driver of the vehicle.

3. A vehicle incorporating the system of claim 1.

4. The system of claim 1, wherein:
the reaction force adjustment device adjusts reaction force characteristics of the vehicle operating device as the reaction force characteristics of the vehicle operating device;
the external influence detection device detects a curving direction of a lane on which the vehicle is currently traveling and a direction along which the risk potential is present as the external influence; and
the reaction force correction device corrects the reaction force characteristics of the vehicle operating device in conformance to the curving direction of the lane and the direction along which the risk potential is present relative to the vehicle detected by the external influence detection device.

5. The system of claim 4, wherein:
the reaction force adjustment device calculates a reaction force adjustment quantity for the vehicle operating device in correspondence to the risk potential and adjusts the reaction force characteristics of the vehicle operating device by incorporating the reaction force adjustment quantity; and
the reaction force correction device, (a) corrects the reaction force adjustment quantity calculated by the reaction force adjustment device if the curving direction and the direction along which the risk potential is present do not match and (b) leaves the reaction force adjustment quantity calculated by the reaction force adjustment device if the curving direction and the direction along which the risk potential is present match.

6. A driving assist system for a vehicle, comprising:
a traveling condition recognition device configured to detect a state of the vehicle and a traveling environment of the vehicle; a risk potential calculation device configured to calculate a risk potential present around the vehicle based upon detection results obtained by the traveling condition recognition device;
a reaction force adjustment device configured to adjust reaction force characteristics of a steering device or an accelerator pedal based upon the risk potential calculated by the risk potential calculation device;
an external influence detection device configured to detect an external influence which will affect an operation of the steering device or the accelerator pedal by a driver; and
a reaction force correction device configured to correct the reaction force characteristics of the steering device or the accelerator pedal adjusted by the reaction force adjustment device, based upon detection results obtained by the external influence detection device, wherein the reaction force adjustment device adjusts at least one of reaction force characteristics of the accelerator pedal and reaction force characteristics of the steering device as the reaction force characteristics of the steering device or the accelerator pedal; and wherein:

the reaction force adjustment device adjusts reaction force characteristics of the accelerator pedal as the reaction force characteristics of the steering device or the accelerator pedal;
the external influence detection device detects a state of inclination of a lane on which the vehicle is traveling as the external influence; and
the reaction force correction device corrects the reaction force characteristics of the accelerator pedal in conformance to the state of inclination of the lane detected by the external influence detection device.

7. A driving assist system for a vehicle according to claim 6, wherein:
the reaction force adjustment device calculates a reaction force adjustment quantity for the accelerator pedal in correspondence to the risk potential and adjusts the reaction force characteristics of the accelerator pedal by incorporating the reaction force adjustment quantity; and
the reaction force correction device makes a correction so as to reduce the reaction force adjustment quantity calculated by the reaction force adjustment device if the lane is an uphill lane and makes a correction so as to increase the reaction force adjustment quantity calculated by the reaction force adjustment device if the lane is a downhill lane.

8. A driving assist system for a vehicle, comprising:
a traveling condition recognition device configured to detect a state of the vehicle and a traveling environment of the vehicle;
a risk potential calculation device configured to calculate a risk potential present around the vehicle based upon detection results obtained by the traveling condition recognition device;
a reaction force adjustment device configured to adjust reaction force characteristics of a steering device or an accelerator pedal based upon the risk potential calculated by the risk potential calculation device;
an external influence detection device configured to detect an external influence which will affect an operation of the steering device or the accelerator pedal by a driver; and
a reaction force correction device configured to correct the reaction force characteristics of the steering device or the accelerator pedal adjusted by the reaction force adjustment device, based upon detection results obtained by the external influence detection device, wherein the reaction force adjustment device adjusts at least one of reaction force characteristics of the accelerator pedal and reaction force characteristics of the steering device as the reaction force characteristics of the steering device or the accelerator pedal; and wherein:
the reaction force adjustment device adjusts reaction force characteristics of the steering device as the reaction force characteristics of the steering device;
the external influence detection device detects a curving direction of a lane on which the vehicle is currently traveling and a direction along which the risk potential is present as the external influence; and
the reaction force correction device corrects the reaction force characteristics of the steering device in conformance to the curving direction of the lane and the direction along which the risk potential is present relative to the vehicle detected by the external influence detection device.

9. A driving assist system for a vehicle according to claim 8, wherein:
the reaction force adjustment device calculates a reaction force adjustment quantity for the steering device in correspondence to the risk potential and adjusts the reaction force characteristics of the steering device by incorporating the reaction force adjustment quantity; and
the reaction force correction device, (a) corrects the reaction force adjustment quantity calculated by the reaction force adjustment device if the curving direction and the direction along which the risk potential is present do not match and (b) leaves the reaction force adjustment quantity calculated by the reaction force adjustment device if the curving direction and the direction along which the risk potential is present match.

10. A driving assist system for a vehicle according to claim 9, wherein:
the reaction force correction device: (a) incorporates the reaction force adjustment quantity along both a steering direction matching the curving direction and a steering direction opposite from the curving direction when the curving direction and the direction along which the risk potential is present match and (b) incorporates the reaction force adjustment quantity along the steering direction matching the curving direction and incorporates the corrected reaction force adjustment quantity along the steering direction opposite from the curving direction when the curving direction and the direction along which the risk potential is present do not match.

11. A driving assist system for a vehicle according to claim 9, wherein:
the reaction force correction device: (a) incorporates the reaction force adjustment quantity along both a steering direction matching the curving direction and a steering direction opposite from the curving direction when the curving direction and the direction along which the risk potential is present match and (b) incorporates the corrected reaction force adjustment quantity along the direction opposite from curving direction without incorporating the reaction force adjustment quantity along the steering direction matching the curving when the curving direction and the direction along which the risk potential is present do not match.

12. A driving assist system for a vehicle according to claim 9, wherein:
the reaction force correction device: (a) changes an inclination of the reaction force characteristics by incorporating the reaction force adjustment quantity along both a steering direction matching the curving direction and a steering direction opposite from the curving direction when the curving direction and the direction along which the risk potential is present match and (b) changes the inclination of the reaction force characteristics by incorporating the corrected reaction force adjustment quantity along the steering direction opposite from the curving direction without altering the inclination of the reaction force characteristics along the steering direction matching the curving direction when the curving direction and the direction along which the risk potential is present do not match.

13. A driving assist system for a vehicle according to claim 10, wherein:
the traveling condition recognition device detects at least a steering angle of the steering device; and
the reaction force correction device corrects the reaction force adjustment quantity based upon the risk potential and the steering angle.

14. A driving assist system for a vehicle according to claim 11, wherein:
the traveling condition recognition device detects at least a steering angle of the steering device; and
the reaction force correction device corrects the reaction force adjustment quantity based upon the risk potential and the steering angle.

15. A driving assist system for a vehicle, according to claim 12, wherein:
the traveling condition recognition device detects at least a steering angle of the steering device; and
the reaction force correction device corrects the reaction force adjustment quantity based upon the risk potential and the steering angle.

16. A driving assist system for a vehicle, comprising:
a traveling condition recognition device configured to detect a state of the vehicle and a traveling environment of the vehicle;
a risk potential calculation device configured to calculate a risk potential present around the vehicle based upon detection results obtained by the traveling condition recognition device;
a reaction force adjustment device configured to adjust reaction force characteristics of a steering device or an accelerator pedal to convey information related to the calculated risk potential to a driver of the vehicle, based upon the risk potential calculated by the risk potential calculation device;
an external influence detection device configured to detect an external influence which will affect an operation of the steering device or the accelerator pedal by the driver; and
a reaction force correction device configured to correct the reaction force characteristics of the steering device or the accelerator pedal adjusted by the reaction force adjustment device, based upon detection results obtained by the external influence detection device, wherein:
the external influence detection device detects a driver's perception of a reaction force generated at the steering device or the accelerator pedal as the external influence; and
the external influence detection device detects a state of depression of the accelerator pedal to judge the driver's perception, wherein the external influence detection device judges the driver's perception to be acute if an extent to which the accelerator pedal is depressed is being increased and judges the driver's perception to be dull if the extent of depression is being decreased.

17. A driving assist system for a vehicle according to claim 16, wherein:
the external influence detection device estimates the state of depression based upon a running resistance of the vehicle.

* * * * *